(12) United States Patent
Walsh

(10) Patent No.: US 7,490,777 B2
(45) Date of Patent: *Feb. 17, 2009

(54) LOW-POWER HAND-HELD TRANSACTION DEVICE

(75) Inventor: Joseph F. Walsh, Lynnwood, WA (US)

(73) Assignee: Moce Solutions LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/499,249

(22) Filed: Aug. 3, 2006

(65) Prior Publication Data

US 2007/0034697 A1 Feb. 15, 2007

Related U.S. Application Data

(63) Continuation-in-part of application No. 10/796,896, filed on Mar. 8, 2004, now Pat. No. 7,093,759, which is a continuation-in-part of application No. 09/847,892, filed on May 2, 2001, now Pat. No. 6,745,937, which is a continuation-in-part of application No. 09/064,395, filed on Apr. 22, 1998, now Pat. No. 6,230,970, which is a continuation-in-part of application No. 08/657,892, filed on Jun. 7, 1996, now Pat. No. 6,144,848, which is a continuation-in-part of application No. 08/657,893, filed on Jun. 7, 1996, now Pat. No. 6,089,456, which is a continuation-in-part of application No. 08/485,083, filed on Jun. 7, 1995, now abandoned, which is a continuation-in-part of application No. 08/482,261, filed on Jun. 7, 1995, now abandoned, which is a continuation-in-part of application No. 08/388,272, filed on Feb. 13, 1995, now Pat. No. 6,089,456.

(51) Int. Cl.
*G06K 7/10* (2006.01)

(52) U.S. Cl. .............................. 235/472.01; 235/462.01

(58) Field of Classification Search ................................
235/162.01–462.25, 472.01, 472.02, 472.03, 235/375, 381, 383
See application file for complete search history.

(56) References Cited

U.S. PATENT DOCUMENTS

| | | | |
|---|---|---|---|
| 7,093,759 B2 * | 8/2006 | Walsh | 235/462.01 |
| 2002/0008145 A1 * | 1/2002 | Walsh et al. | 235/462.46 |
| 2004/0242267 A1 * | 12/2004 | Walsh | 455/556.1 |

* cited by examiner

*Primary Examiner*—Thien M Le
(74) *Attorney, Agent, or Firm*—Perkins Coie LLP

(57) ABSTRACT

An electronic hand-held device and method for inputting and sending requests and for receiving and outputting responses to the requests. The electronic hand-held device is a coupled to a telecommunications link over which requests are sent and responses are received. The electronic hand-held device can input request data in any number of different information media, including audio tones and voice signals, mechanical input to a keypad, printed bar codes, magnetic data stored in credit cards, and electronic data stored in electronic smart cards. The electronic hand-held device can output responses through an audio speaker, a visual LCD display device, and, optionally, through other output devices including printers. The electronic hand-held device is especially well suited for order entry and acquisition of product information.

23 Claims, 31 Drawing Sheets

LOW-POWER HAND-HELD TRANSACTION DEVICE

RELATED APPLICATIONS

This application is a continuation-in-part of U.S. application Ser. No. 10/796,896, filed Mar. 8, 2004, now U.S. Pat. No. 7,093,759 which is a continuation-in-part of U.S. application Ser. No. 09/847,892, filed May 2, 2001, now U.S. Pat. No. 6,745,937, issued Jun. 8, 2004; which is a continuation-in-part application of U.S. application Ser. No. 09/064,395, filed Apr. 22, 1998, now U.S. Pat. No. 6,230,970, issued May 15, 2001, which is a continuation-in-part application of U.S. application Ser. No. 08/657,892, filed Jun. 7, 1996, now U.S. Pat. No. 6,144,848, issued Nov. 7, 2000, which is a continuation-in-part application of U.S. application Ser. No. 08/657,893, filed Jun. 7, 1996, now U.S. Pat. No. 6,089,456, issued Jul. 18, 2000, which is a continuation-in-part of U.S. application Ser. No. 08/388,272, filed Feb. 13, 1995, now U.S. Pat. No. 5,696,825, issued Dec. 9, 1997; which is a continuation-in-part of U.S. application Ser. Nos. 08/482,261 and 08/485,083, both filed Jun. 7, 1995, now abandoned.

TECHNICAL FIELD

This invention relates to hand-held telecommunications devices and, in particular, to an electronic hand-held device for inputting and sending requests and for receiving and outputting responses to the requests.

BACKGROUND OF THE INVENTION

The acquisition of goods and services by placing orders with retailers and distributors is a vital component of modern commerce. Several different technologies for placing and receiving commercial orders currently account for the bulk of commercial order entry. Probably the most familiar and natural method of order entry is that of personal travel to a retail supplier for a face-to-face transaction paid for either in cash, by check, by credit card, or by an electronic transfer of funds. While such face-to-face transactions allow a purchaser to thoroughly inspect the goods and services that are being purchased, and while such transactions are relatively secure for both the purchaser and the retailer, especially when paid for in cash, face-to-face transactions are extremely inefficient in time and in communications costs. A purchaser generally travels to the retailer's place of business by car or by public transportation at a relatively high cost in time and energy, often incurring significant risks in personal safety. While a cash transaction is relatively secure, the process of bringing the cash to the retailer's place of business and of transporting purchased goods back to their place of use or storage often may not be secure. Paper money can be forged, checks can be misappropriated and fraudulently passed, credit cards can be misappropriated and fraudulently used, and electronic funds transfer may be vulnerable to errors and to electronic theft.

A second familiar method for placing an order and receiving goods and services is by use of the telephone. Many of the above-described risks for face-to-face transactions are avoided by using the telephone as a medium for commerce. A telephone transaction may be much more efficient in time and in communications costs than traveling to a retailer's place of business. The risks inherent in traveling and carrying cash are avoided. However, telephone communications are notoriously insecure and, whereas telephone transactions may require less staffing and facilities overhead from the standpoint of a retailer, such transactions still require either human operators or relatively time-inefficient, cumbersome, and often annoying voice menu systems and recorded-voice order-entry systems.

Although popular use of the Internet is a relatively recent phenomenon, and use of the Internet as a medium of commerce is an even more recent phenomenon, the Internet has emerged to become one of the fastest growing and most technologically sophisticated mediums for order entry. An Internet user can quickly conduct a comparative analysis of products, identify retailers and distributors for those products, place orders through relatively easy mouse and keyboard input, and pay for the transactions using relatively secure encrypted communications for the exchange of credit card information and other types of electronic funds transfer. The Internet provides a much richer communications medium than the telephone by providing the display of graphical information as well as text-based and sound-based information. A disadvantage of the Internet is that a user is generally required to use a personal computer. Personal computers are expensive, costly to maintain over time, and inconvenient to carry.

The trends in order entry and commercial transactions are clear. Despite the disadvantages discussed above, electronic commerce will soon become the preferred medium for the exchange of goods and services. In many cases, the increase in time efficiencies and decreases in energy costs and in overheads for staffing and maintaining retail facilities more than offset the disadvantages in the lack of security and in the expense of the electronic order input devices, including personal computers that are currently necessary for electronic commerce. However, in order to make electronic commerce and electronic order entry fully accessible to the general public, and even more advantageous with regard to time and expense, a new, relatively inexpensive, lightweight, and mobile hand-held telecommunications device for order input via a secure communications path would be desirable. An electronic order-entry device that offered the ease of use and the mobility of a wireless telephone would be especially desirable, and a telecommunications device that comprises a multi-media order-entry device and a telephone in one hand-held package would be most desirable. In addition to use in placing orders for products and services, such a hand-held telecommunications device would find wide application in specifying, acquiring, and displaying information. Applications may include scanning barcodes contained in printed materials such as newspapers, magazines, and catalogs, or contained on products, such as airplane tickets and entertainment event tickets, and providing additional information about the products, including information about an airplane flight or entertainment event identified by the barcode. The additional information provided by such a hand-held telecommunications device could be effectively presented as spoken dialogue, displayed text, music, or displayed graphics, such as such as images of people, places, or things such as products for sale. One or two-dimensional barcode in a printed material may also contain an access code, such as an IP address, a URL, a web site address, a product/service ID code, a phone number, or other information that rapidly provides a user with secure electronic access to a host server.

SUMMARY OF THE INVENTION

One embodiment of the present invention provides a small, low-power, hand-held transaction device for inputting requests, transmitting the requests through a telecommunications link to a server computer, receiving responses to the transmitted requests from the server computer, and outputting the responses. The low-power, hand-held transaction device may receive mechanical input through a keypad, audio input through a microphone, and other types of inputs, including printed barcodes and information stored either magnetically or electronically on credit cards and smart cards. This input is then encoded and sent to the server via a telecommunication link. The information contained in the responses that are returned from the server computer may be output in one or more information output types, including displayed alphanumeric symbols, displayed alphanumeric symbols and graphical images, such as pictures of products, voice, music, and printed text and graphical images. Orders from the order entry device to the server computer may be combinations of voice commands, bars codes, card information, or keystrokes. The order entry device may store inputs entered while off line. The stored inputs, such as UPC codes, may be sent to the server computer at a later time. The server computer may also provide communication with a live operator.

For convenience of use, the low-power, hand-held transaction device draws the necessary electrical power to operate from internal batteries, a telephone line loop current, or a computer port. Telecommunications server providers however, generally provide relatively small amounts of electrical power to wireless phones and accessories in order to extend battery life. In order to support the variety of input and output medium handled by the low-power, hand-held transaction device, careful power management strategies and a number of low-power internal components are incorporated into the low-power, hand-held transaction device.

Various embodiments of the low-power, hand-held transaction device may be connected to different types of telecommunications links. These types of telecommunications links include a standard telephone line, a serial port connection to a computer, a wireless telephone, and a PBX telephone line. The low-power, hand-held transaction device can be used both as a telephone as well as a request-transmitting and response-receiving device. The hand-held transaction device may provide peer-to-peer wireless telephone communication, thus providing a mobile wireless telephone as well as a transaction capability within a single device.

The low-power, hand-held transaction device includes support for secure transactions at the hardware level. The low-power, hand-held transaction device may include a protected memory that is very difficult to access by devices or monitors external to the low-power, hand-held transaction device. Confidential information, such as credit card numbers, addresses, account numbers, and encryption parameters, may be input into the low-power, hand-held transaction device and stored within the protected memory. When a credit card number must be included within a request that is transmitted to the telecommunications link, the credit card number may be encrypted within the low-power, hand-held transaction device prior to transmission. Thus, an unencrypted credit card number is not accessible to an external device or to a network monitor. The credit/debit card information may be keyed in by the user or may be electronically read in by the hand-held transaction device or stored in memory of the transaction device.

Connecting to an on-line server generally requires use of an access code. An access code may be stored in memory of the LHTD or may be entered by a user using a keypad, barcode reader, card reader, or any combination of these entry methods. A common access code is a phone number of an on-line server or Internet access provider. This phone number may be entered by a user via a keypad, activated from LHTD memory, or may be read in via a barcode reader or card reader.

There are an almost limitless number of different applications for the LHTD. For example, a user may see an interesting printed ad with a bar code. The user then may use the LHTD to read a bar code in the ad, after which the LHTD rapidly provides access to a host server that, in turn, provides an instant audio-visual response to the printed ad. In one application, a user employs the LHTD to listen to music clips before ordering tickets to a musical. In other applications, a user employs the LHTD to read a bar code to get sports scores or flight information. In still another example, a user uses the LHTD to scan bar codes on drugs to get the latest warnings and instructions in one of several optional languages.

DETAILED DESCRIPTION OF THE INVENTION

Figure 1:
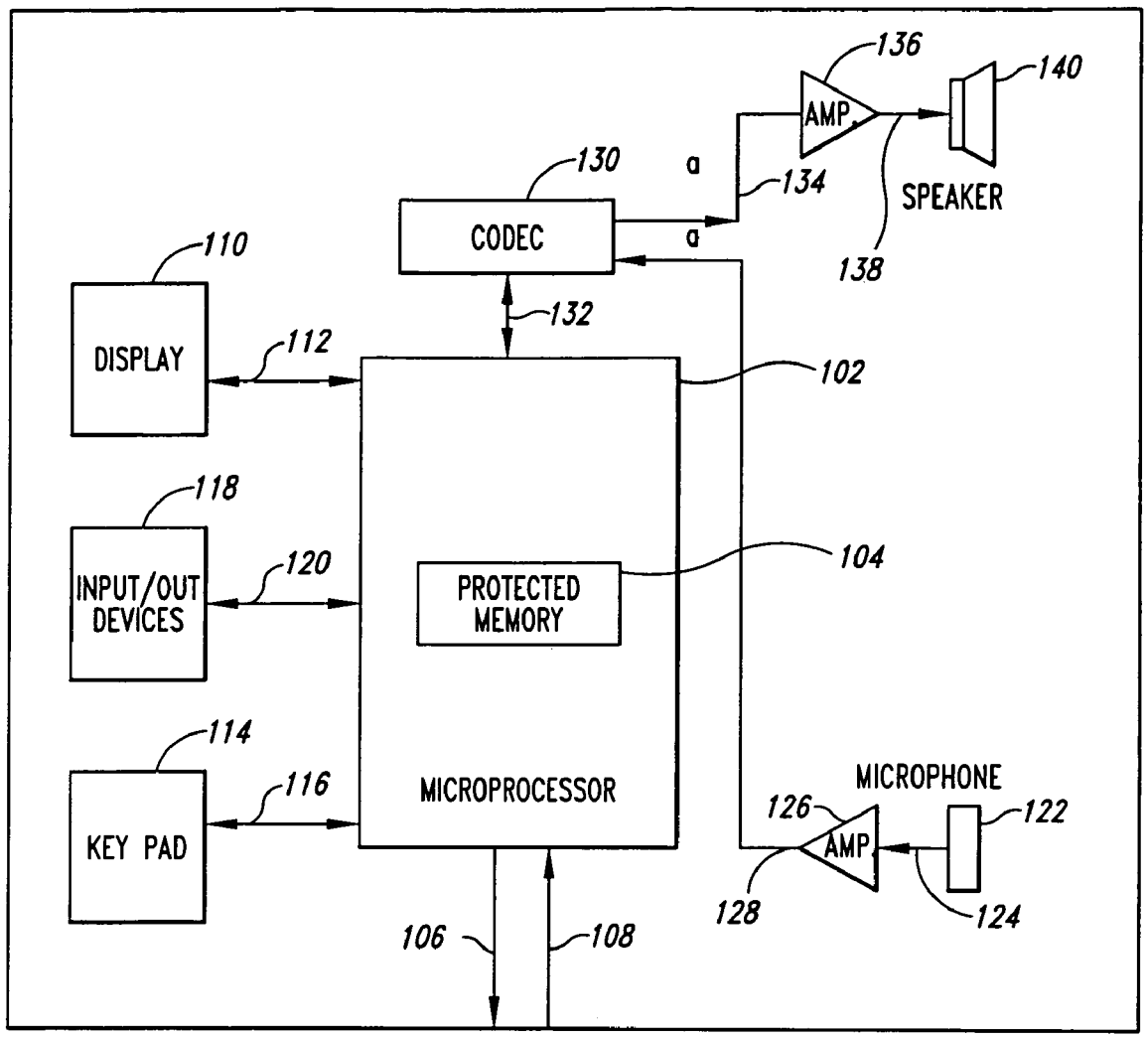
FIG. 1 is a high-level block diagram of the LHTD.

Various embodiments of the present invention provide low-power, hand-held transaction devices ("LHTDs") that can be connected to various types of telecommunications links. These different types of telecommunication links may include a standard telephone line, a PBX telephone line, a wireless telephone, a personal communication system ("PCS") telephone, a cordless telephone, and an RS232 or universal serial bus ("USB") to a computer that is in turn coupled to a remote server computer via a telecommunications link. A LHTD may be a plug-in module to a telephone or an LHTD and a wired or wireless transceiver may be designed into single, hand-held package performing the functions of both a multi-media order entry device and a telephone. The LHTD order entry device and the telecommunication link may share electrical and mechanical components, as well as a power source, such as telephone loop current, wireless phone battery, or a computer port.

Various embodiments of present invention use different types of power sources. In the interest of brevity, the phrase "drawing power from the telecommunications link," and other such descriptive phrases, is intended to refer to the drawing of power from any of the different types of power sources. For example, telephone systems provide power through telephone lines. Serial RS232 or USB computer ports provide power from handshake lines or from a power pin. Cellular/PCS phones provide power through external connectors. Embodiments of the present invention that are built-in embodiments within wireless phones draw power from wireless phone batteries.

Various embodiments of the LHTD include different types of data input components for inputting data from different types of data-containing media. LHTDs generally contain a microphone for inputting audio data, including voice data, and a keypad for inputting alphanumeric symbols. In addition, a LHTD may contain a barcode reader for reading and inputting printed barcodes, a magnetic card reader for inputting data stored in the magnetic strip of credit cards, and/or an electronic smart card reader for inputting data stored within smart cards.

The input data is collected and formatted into a request by the LHTD and then is generally transmitted to a server computer through the telecommunications link. The server computer carries out one or more operations corresponding to the request, collects any information obtained or retrieved as a result of the operations, and returns the information as a response to the LHTD, transmitted from the server computer to the LHTD over the telecommunications link. The LHTD then directs portions of the response to appropriate data output components that output data of different types. For example, a LHTD commonly contains a low power display, such as a liquid crystal display ("LCD"), that displays text-based and graphical information, such as pictures and an audio speaker for outputting audio data, including voice data. Additional types of data output components may be included in a LHTD, including a printer component.

In order to provide maximum convenience and availability to a user, the LHTD draws sufficient electrical power from the telecommunications link (telephone line loop current, batteries, or computer port to which it is connected) to input data, transmit requests over the telecommunications link, receive responses to the requests from the telecommunications link, and output the responses. The LHTD carefully manages power consumption by the various data input, data transfer, and data output components within the LHTD in order to operate on the relatively meager electrical energy supply provided by the telecommunications line or batteries. The components are generally maintained in inactive states and are only activated when needed to perform their respective functions. For example, communications between the LHTD and a server computer may follow a request/response paradigm, and components within the LHTD may need not be continuously maintained in an active state in order to field communications from the server computer, but can, instead, be activated only for the time required to send a request and receive a response to that request. The LHTD, when connected to a wired or wireless telecommunications link, may also be used to send and receive analog signals through the telecommunications link and thus operate as an ordinary telephone. The LHTD may also transmit and receive voice data encoded as digitized packets and thus operate as a digital telephone. The LHTD enables person-to-person voice communications as well as bi-directional voice communications with a server. The server may record voice messages or recognize voice messages as commands. The server may also enable live communications between the LHTD user and another person, such as a merchant employee.

The LHTD may apply data compression to the encoded voice data by applying one of a number of standard compression algorithms. When data compression is applied, the number of digitized packets transmitted for a given period of voice data input can be significantly decreased, increasing the data transmission rate and significantly decreasing the amount of power required to operate the transceiver. Data compression of digitally encoded voice data is thus a significant component of the power management strategy.

In order to be effectively used as a secure transaction device, the LHTD may provide for secure storage of confidential information, including credit card numbers. The LHTD may include a protected memory with restricted access to devices external to the LHTD. Credit card numbers read by a magnetic credit card reading component or Smart Card reader may be stored within the protected memory and may be transmitted as part of a request after being encrypted within the LHTD prior to transmission to the telecommunications link.

FIG. 1 is a high-level block diagram of the LHTD. A low-power microprocessor 102 included in the LHTD 100 executes firmware routines (not shown) that coordinate operation of the input, output, and transceiver components of the LHTD 100. The microprocessor 102 may contain a protected memory 104 that is used to store confidential information, such as credit card numbers. This protected memory 104 can be written to and read from by the firmware routines that execute within the microprocessor 102. Attempts to read the contents of a location of protected memory 104 by an external device or by a software routine other than a firmware routine may result in erasing the values in any protected memory locations accessed, without returning the values to the external device or software routine. This protected memory is nonvolatile, the contents surviving power-down and power-up cycles. The microprocessor may also include non-protected nonvolatile memory, or separate non-protected nonvolatile memories may be included. Nonvolatile memory can store requests for subsequent transmission. The LHTD 100 transmits and receives information to and from the telecommunications link (not shown) via output signal line 106 and input signal line 108, respectively. Output signal line 106 and input signal line 108 transmit digital signals which may be, as discussed below, converted to and from analog signals that are transmitted over the telecommunications link.

The LHTD 100 includes a visual display component 110 for output of alphanumeric symbols, including text-based data, and for output of graphical images, such as pictures. The visual display 110 is commonly a LCD. Data to be output is transmitted in digital form from the microprocessor 102 to the visual display device 110 through a digital signal line 112. The LHTD includes a keypad 114 that enables mechanical input of alphanumeric symbols through a digital-signal line 116 to the microprocessor 102. The LHTD may include additional input and output devices, collectively depicted in FIG. 1 as device 118 connected to the microprocessor 102 by the digital signal line 120. These additional input and output devices may include a barcode reader, a magnetic card reader, an electronic smart card reader, and a printer. Audio data, including voice data, is input to the LHTD through a microphone 122 that outputs an analog signal via an analog signal path 124 to an amplifier 126. The amplifier 126 amplifies the analog signal and sends the amplified analog signal through a signal path 128 to a codec component 130 that converts the amplified analog signal to a digital signal that is directed to the microprocessor 102 through a digital signal line 132. Audio data, including voice data, received from the telecommunications link via digital input 108, is processed by the microprocessor 102, transmitted to the codec device 130 via the digital signal line 132, converted to an analog signal by the codec component 130, and output by the codec component 130, via an analog signal line 134, to an amplifier 136. The amplifier 136 amplifies the analog signal and passes the amplified analog signal, via analog signal path 138, to the audio speaker 140 for output.

Certain DSP chips have microprocessors with sufficient processing ability to perform may of the functions of an LHTD, including decoding bar code signals, encrypting and decrypting data, communicating voice and data to a host server, and executing the power management and power conservation communication protocols. Some DSPs have A-to-Ds and D-to-As capable of implementing codecs and modems used in an LHTD. An LHTD employing such DSP chips is considered to fall within the scope and spirit of the present invention.

Power is an important issue in LHTD design. Wireless telephone service providers wish to maximize user services by maximizing wireless phone battery life. Low current draw also encourages use of convenient small phone batteries. Phone lines provide very limited current to operate the LHTD, thus wired LHTDs also require power management. The LHTD employs careful power management strategies and low-power internal components in order to conserve sufficient electrical energy to operate the various components shown on FIG. 1. For example, amplifiers 126 and 136 may be dual-power mode amplifiers, discussed in detail below. These amplifiers draw very little current when there is no input signal to be amplified. Upon input of an input signal, a dual-power mode amplifier transitions to a high-power state in which the amplifier draws significant amounts of current in order to boost the voltage of the output signal. Thus, dual-power mode amplifiers draw significant current only when necessary.

As another example, device 118 may represent a barcode reader. Conventional barcode readers draw relatively large amounts of electrical power in order to operate an internal microprocessor, a light source (not shown), and an image sensor that collectively illuminate a target barcode and read the barcode via reflected light. Continuous operation of the barcode reader, even when the barcode reader is only activated by a push button trigger, may quickly deplete the electrical energy available to the LHTD. By careful design of communication protocols, the low power barcode reader 118 included in the LHTD 100 may be activated in a low-power state until it is needed, and is only then fully activated to a high-power state in order to read the barcode and transmit the barcode through the digital signal line 120 to the microprocessor 102. The LHTD may optionally use a low power laser, CCD, LED, optical, electrical, or magnetic readers.

When no data is being input to the LHTD 100, and when no responses are expected by the LHTD 100 from the telecommunications link, components of the LHTD 100 may be maintained in inactive states in order to conserve electrical power. The microprocessor 102 may include an internal timer (not shown) that can be set to awaken the microprocessor 102 at some pre-selected time interval so that the microprocessor can suspend processing when there are no immediate processing tasks at hand. As yet another alternative, a multi-speed microprocessor can be used as the LHTD microprocessor 102. When there are no processing tasks, the clock rate of the multi-speed microprocessor can be lowered to conserve power, and when a processing task becomes available, the clock rate of the multi-speed processor can be raised to provide sufficient processing power to efficiently complete the processing task. Multi-speed processors commonly operate at clock rates from 32 kHz to about 40 MHz or more. The LHTD may save power and hardware costs by sharing a microprocessor and other components with wired or wireless telephone circuitry.

By careful conservation of electrical power, the LHTD 100 can provide a large assortment of input and output devices with power. These devices may not be simultaneously operated under the electrical power constraints imposed by the small amount of electrical power available from the telecommunications link loop current or may cause excessive battery drain. LHTD components are activated and maintained in a high-power state only as long as necessary to complete a task.

Figure 2:
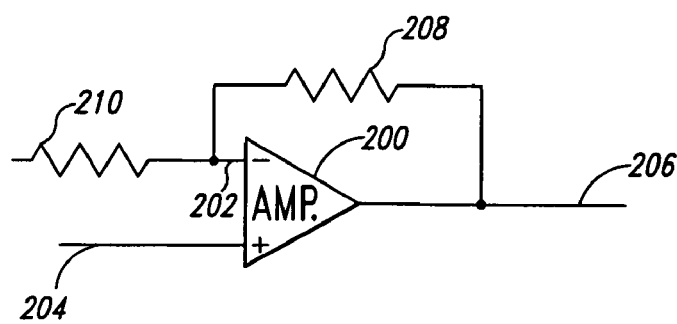
FIG. 2 is a schematic diagram of a dual-power mode amplifier.

FIG. 2 is a schematic diagram of a dual-power mode amplifier. The signal to be amplified is input on signal line 202 to the dual-power mode amplifier 200. A reference signal line is input to the dual-power mode amplifier 200 on input line 204. The amplified signal is output on output signal line 206. When the voltage differential between the input signal on line 202 and the reference signal on line 204 is less than a threshold value, the dual-power mode amplifier remains in a low-power state, drawing little or no current from the power supply (not shown) and producing no output signal. When, however, the voltage differential between the input signal on line 202 and the reference signal on line 204 exceeds the threshold value, the dual-power mode amplifier 200 transitions to a high-power state in which the dual-power mode amplifier 200 draws current from the power supply and produces an amplified signal on output line 206. Resistors 208 and 210 together set the gain for the amplifier, where the gain is the ratio of the resistance of resistor 208 divided by the resistance of resistor 210. The dual-power mode amplifier 200 has a fixed threshold voltage for the low power to high-power transition. The gain is set to provide a desired output voltage from relatively low-voltage input signals while allowing a reasonable level of discrimination based on the threshold voltage differential for the dual-power mode amplifier 200. By using dual-power mode amplifiers for amplifying signals input to the data input components of the LHTD, the data input components draw significant current only when input is being transmitted to them.

Figure 3:
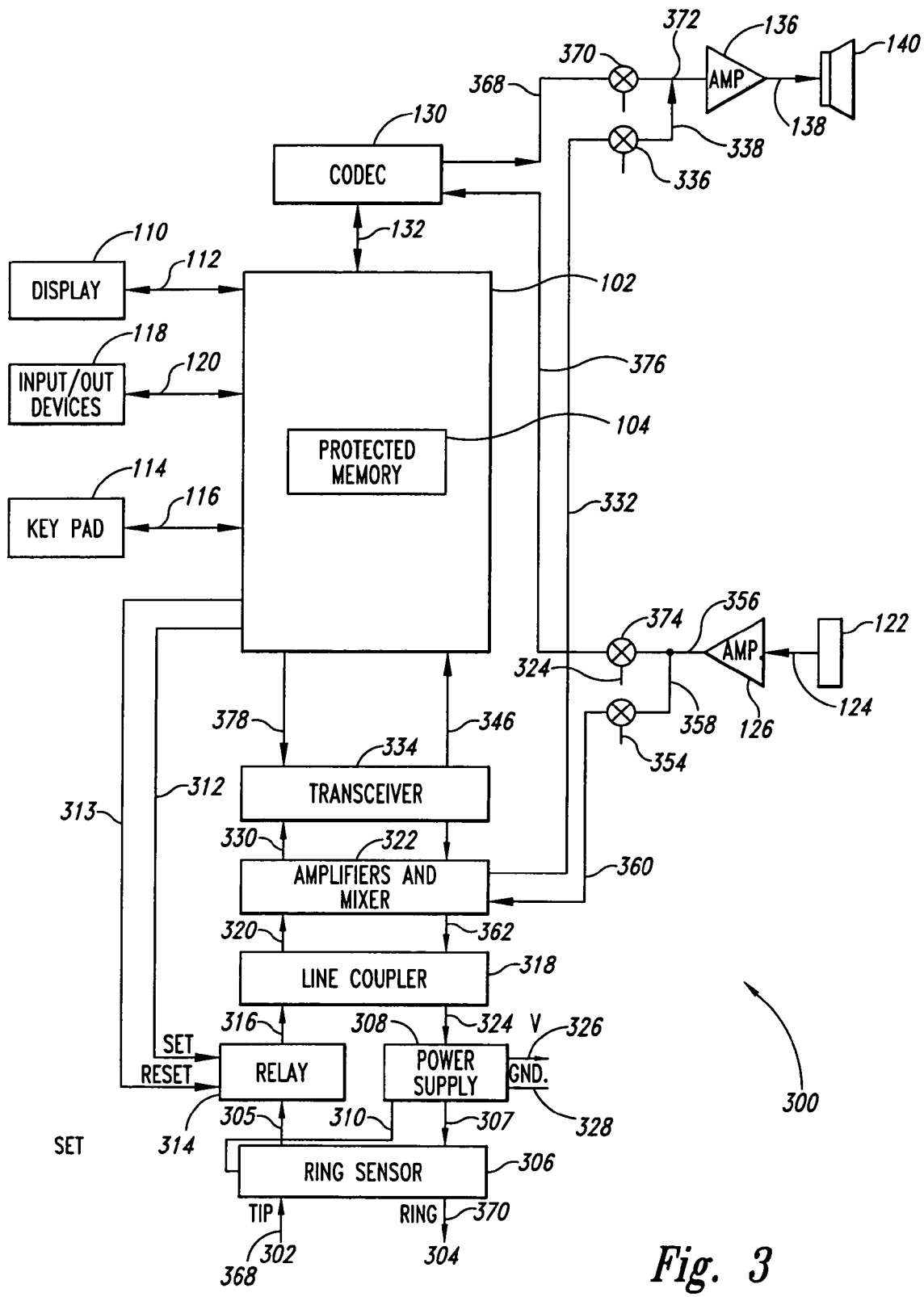
FIG. 3 is a block diagram of a LHTD coupled to a standard telephone line.

FIG. 3 is a block diagram of a LHTD coupled to a standard telephone line. FIG. 3 shows many of the same components of the LHTD as shown in FIG. 1. The components of the LHTD that are shown in FIG. 3 as well as in FIG. 1 are labeled, in FIG. 3, with the same numerical labels with which the components are labeled in FIG. 1. In the interest of brevity, descriptions of those components of FIG. 3 also shown in FIG. 1 will not be repeated.

Current flows from the telephone line into the LHTD 300 via the tip input 302 and returns to the telephone line via the ring output 304. The input current from the telephone line passes to the ring sensor 306, which detects and responds to the relatively high-voltage alternating current ("ac") signal that is transmitted through the telecommunications link to notify a receiving device, such as the LHTD, of an incoming telephone call. The ring sensor 306 may optionally direct current derived from the incoming ring signal to the power supply 308 via ac signal line 310. The user may also activate the power supply 308 by activating an "off hook switch." The power supply 308, may, in turn, awaken the microprocessor and power it to begin processing the call. As part of its initial processing, the microprocessor 102 sends a SET signal via signal line 312 to a relay 314. The relay 314 acts as a switch that is closed, or activated, by the SET signal. When relay 314 is activated by the SET signal, the relay 314 passes the current from the telecommunications link via signal path 316 to a line coupler 318, commonly a transformer. The line coupler 318 extracts the ac signal from the current input from the telephone line and passes the extracted ac signal through ac signal line 320 to an amplifier and mixer 322. The line coupler 318 passes the direct current ("dc") component of the current input from the telephone line via signal line 324 to the power supply 308, which rectifies and regulates the current and provides a stable dc current on output signal line 326 relative to ground 328. The amplifier and mixer 322, including an optionally dual-power mode amplifier described above and shown in FIG. 2, amplifies the incoming ac signal from the ac signal line 320 and passes the amplified signal to output signal lines 330 and 332. Output signal line 330 passes the amplified ac signal to the transceiver 334. Output signal line 332 passes the amplified ac current through a switch 336 and ac line 338 to amplifier 136, a dual-power mode amplifier that outputs a sufficiently high-voltage current via output signal line 138 to drive the audio speaker 140. The signal branch effected by the mixer component of the amplifier and mixer 322 may allow analog telephone signals to be routed directly to the audio speaker 140, whereas digitized signals are passed to transceiver 334 which converts the analog signal input via ac line 330 to a digital signal that is passed from the transceiver 334 to the microprocessor 102 via signal line 346.

Firmware routines running within the microprocessor 102 control whether communications are conducted by analog signals or by digitized signals. These firmware routines activate and deactivate switches, such as switch 336, to direct communication signals to appropriate signal processing components. The communications protocols used by the LHTD are request/response protocols, and may anticipate whether a response will be communicated and received as an analog signal or as a digitized signal. Therefore, the transceiver 334 is activated by a signal sent from the microprocessor 102 for digitized communications. The transceiver may not need to be continuously active in order to monitor the input signal of line 330 for unexpected and unrequested transmissions. Thus, the request/response paradigm, communications protocols that may be used by the LHTD, allow for significant power and time conservation. Minimizing the time during which components in the LHTD are active enables timesharing of components, such as the microprocessor, codec, and transceivers, between multi-media order-entry and telephone circuitry. By careful design of hardware and protocols, component activation and deactivation is not apparent to the user.

In addition to the transceiver 334, the LHTD may include a multiple frequency ("MF") or a dual-tone multiple frequency ("DTMF") tone generator (not shown) to generate analog control signals that do not occur in speech, music, or modem communications. DTMF tones may be sent, for example, by the LHTD to interrupt analog voice data transmissions sent from a remote transceiving device so that a request can be immediately sent in digitized form by the LHTD to the remote transceiving device. In this case, the DTMF tone is used, essentially, as an interrupt signal. DTMF tones can also be used for initial negotiations between the transceiver 334 of the LHTD and a remote transceiver (not shown). Various transmission parameters, such as baud rate, are normally exchanged between two transceivers, and mutually acceptable parameters are agreed upon by the transceivers during a negotiation process that may last on the order of tens of seconds. By instead encoding the transmission parameters as DTMF signals, the LHTD can effect an extremely fast connection to a remote transceiving device capable of receiving and interpreting the DTMF signals. The DTMF generator may also be used to dial telephone numbers.

The LHTD may optionally support analog or digital audio communications. The LHTD may optionally support both analog and digital voice communications.

As described above, incoming analog signals may be routed by the mixer component of the amplifier and mixer 322 to the audio speaker 140 for output. Audio tones, including voice data, input to the LHTD through microphone 122 are passed through a signal line 124 to the dual-power mode amplifier 126, which amplifies the audio signal and, when switch 354 is closed, outputs the amplified ac audio signal through signal lines 356, 358, and 360 to the amplifier and mixer 322. The amplified ac signal is then directed through signal line 362 to line coupler 318 and back to the telecommunications link. The LHTD may, when switches 336 and 354 are both closed, operate as a standard telephone, transmitting analog signals input through the microphone 122 to the telecommunications link and receiving analog signals from the telecommunications link and passing those signals to audio speaker 140.

The LHTD may support digital voice communications. In this form of telecommunications, analog voice signals are digitized and placed into digital packets that are transmitted over the telecommunications link. A digitized voice data packet is received from the telecommunications link by the transceiver 334 and converted into a digital signal transmitted via digital signal line 346 to microprocessor 102. The microprocessor processes the digital signal to extract the digital voice signal and passes the digital voice signal over digital signal line 132 to the codec 130. The codec 130 is a digital-to-analog and analog-to-digital converter. The digital voice signal is converted by the codec 130 to an analog voice signal that the codec outputs via analog signal line 368, switch 370, and analog signal line 372 to amplifier 136 for output to speaker 140. Voice input to the LHTD through microphone 122 is amplified by amplifier 126 and passed through analog signal lines 356, switch 374, and analog signal line 376 to the codec 130, where the analog signal is converted into a digital signal and directed through digital signal line 132 to microprocessor 102. The microprocessor then packages the digital voice signal into a digitized packet and outputs that packet via digital signal line 378 to transceiver 334. The transceiver then transmits the digitized packet to the telecommunications link. Digitized packets can also be used for encoding and transmitting audio signals for music and non-voice audio tones.

Transceiver 334 provides the LHTD with bi-directional communications via the telecommunications link. Bi-directional communications enable the exchange of encryption parameters and sequence numbers between the LHTD and the remote server computer prior to transmission of data. Thus, bi-directional communications make highly secure data transfers from the LHTD to a remote server computer possible.

Figure 4:
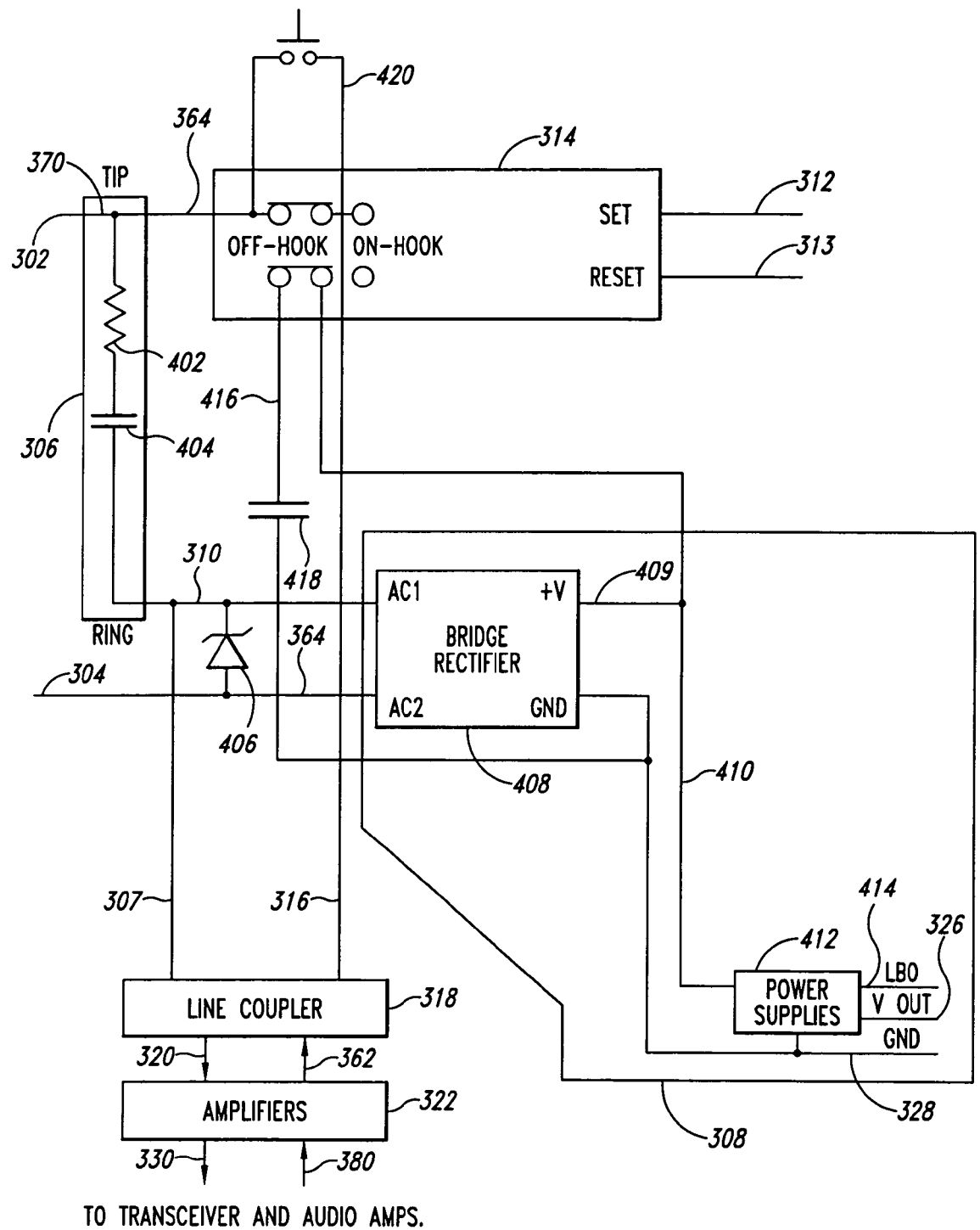
FIG. 4 is a more detailed block diagram of the ring sensor, relay, and power supply components of the LHTD shown in FIG. 3.

FIG. 4 is a more detailed block diagram of the ring sensor, relay, and power supply components of the LHTD shown in FIG. 3. The features shown in FIG. 4 that are also shown in previous figures are labeled in FIG. 4 with the same numerical labels with which they are labeled in previous figures. In the interest of brevity, descriptions of these features will not be repeated below.

The optional ring sensor 306 or the user pressing switch 420 enables the line powered LHTD to answer an incoming call. The optional ring sensor 306 comprises a resistor 402 and capacitor 404. The capacitor 404 serves to block dc and pass only ac. A Zener diode 406 clamps the telephone line voltage to a maximum potential, such as 10V. Thus, the ring sensor responds to a ring signal transmitted through the telecommunications link, normally with an average voltage in excess of 150 volts, by directing ac current through an ac signal line 310 to the power supply 308. The power supply comprises a bridge rectifier 408 and voltage regulators 412. Incoming ac from the ring sensor input through ac signal line 310 is processed by the bridge rectifier to produce positive voltage at output 409. The bridge rectifier compensates for reverse polarity of the telecommunications link. The positive voltage output from the bridge rectifier is output as dc through signal line 410 to the voltage regulators 412. The voltage regulators process the dc from the bridge rectifier to produce a constant-voltage dc output on output signal line 326. If the incoming dc is insufficient to produce the constant-voltage dc output, a low battery output ("LBO") signal is transmitted from the voltage regulators 412 over the LBO signal line 414 to the microprocessor 102. This causes the microprocessor to pause for a short time interval and to then restart and test the LBO signal, waiting until sufficient power is available to begin processing an incoming call. As discussed above, the relay 314 acts as a switch. When the switch is open, or deactivated, no current is passed from the telecommunications link through the relay 314 and through signal line 316 to line coupler 318. When the relay is closed, or activated, current is passed from the telecommunications link through the relay 314 and signal line 316 to the line coupler 318. As discussed above, the relay 314 is activated by a SET pulse signal from microprocessor 102 input through the signal line 312 and is deactivated by a RESET pulse signal from the microprocessor 102 input to relay 314 through input 313. The microprocessor 102 is awakened from sleep mode or, in other words, reset, when voltage is output from the power supply 412 to the voltage output 326. Thus, an incoming ring signal is passed through the ring sensor 306 to the power supply 308 and, finally, as a constant voltage to the microprocessor 102. Upon awakening, the microprocessor 102 sends a SET signal to the relay 314, activating the relay 314 and allowing current to pass through the line coupler 318.

When the relay is activated, and current is passing from the telecommunications link to the power supply 308, current also passes via signal line 410 back to the relay 314 and through signal line 416 to a capacitor 418. This capacitor 418 is able to store energy obtained from the telecommunications link for later use. A battery can be used in place of capacitor 418 in order to save greater amounts of electrical energy. The energy stored in capacitor 418 can be used to operate the LHTD when the LHTD is not connected to a telecommunications link. The energy stored in capacitor 418 can also be used to activate microprocessor 102 in response to input from a user of the LHTD. When the LHTD is activated by push button 420, current is drawn from capacitor 418 and the telecommunications link through signal line 410 to the voltage regulator 412, which outputs the current on output 326. When the power supply is thus activated to output a constant voltage, the microprocessor 102 is awakened and sends a SET signal to activate the relay 314. Once the relay 314 is activated by the SET signal, the LHTD continuously draws current from the telecommunications link via tip input 302, relay 314, and signal line 410 to the voltage regulator 412.

Because the current available from a telephone line may be inadequate to power the components of the LHTD, the power supply 308 preferably employs a step-down switching regulator 412. This type of voltage regulator decreases the voltage supplied by a telecommunications link and correspondingly increases the current. As a result, the step-down switching voltage regulator generates a constant 5V, 3V, or both 5V and 3V outputs, or other voltages depending on the voltage requirements of components used within a particular embodiment of the LHTD.

The LHTD may be connected to input or output components via a serial port such as RS232. The LHTD may draw power from the serial port. In some applications, such as interfacing to battery power devices, the LHTD may not draw power from the RS232 port. In these cases, the LHTD will be powered by a battery or telephone loop current.

The LHTD may be coupled to a local computer via an RS232 connection or a USB connection. A USB connector has a power pin that may provide power to the LHTD. The local computer is, in turn, connected to a remote server computer via a telecommunications link. When coupled to a local computer via an RS232 connection, the LHTD sends and transmits digital communication signals through the RS232 and, as in the case of a telephone line connection, derives sufficient electrical power from the RS232 connection to power the internal components of the LHTD.

Figure 5:
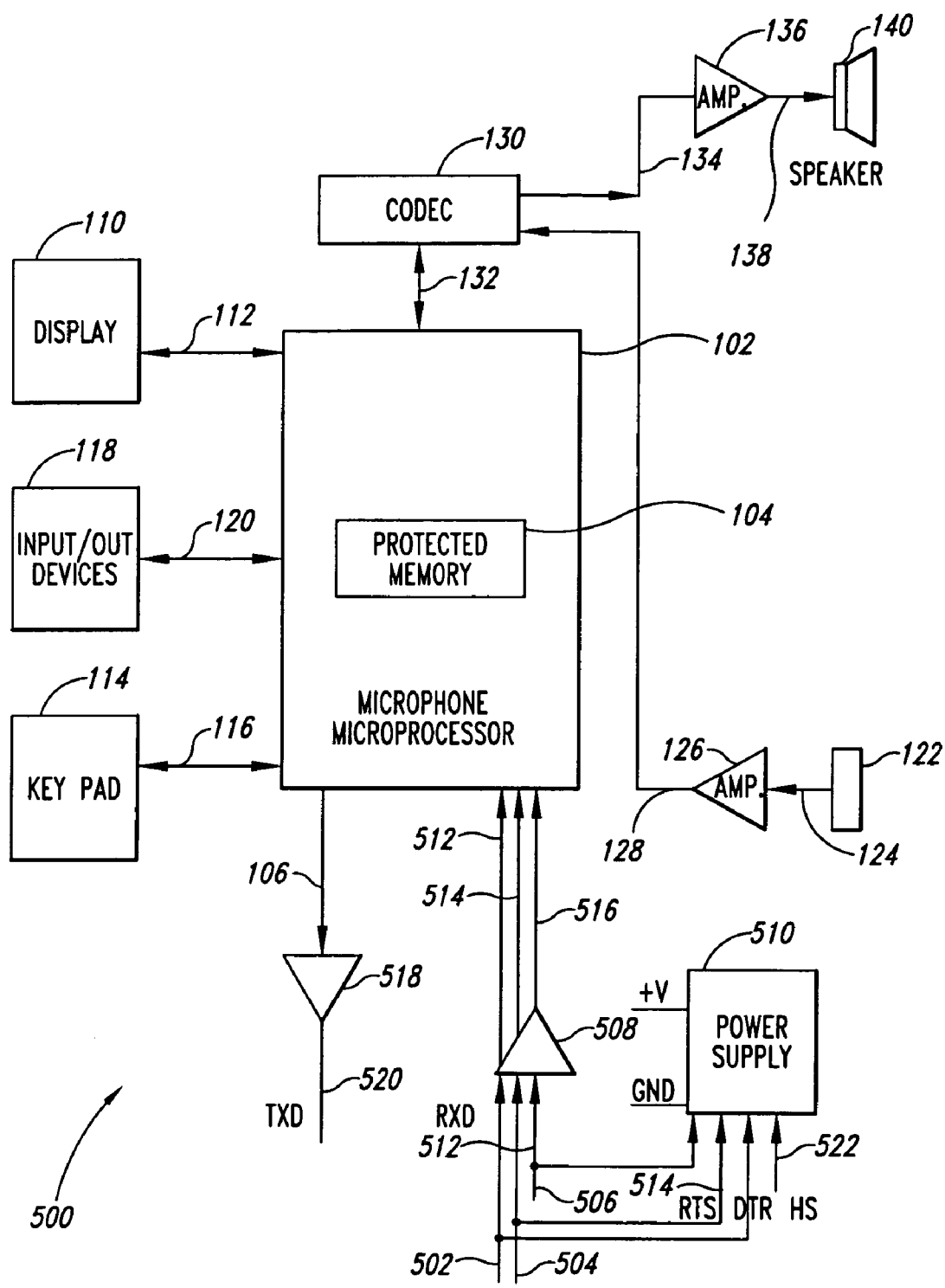
FIG. 5 is a block diagram of the LHTD coupled to a computer through an RS232 connection.

FIG. 5 is a block diagram of the LHTD coupled to a computer through an RS232 connection. The components shown in FIG. 5 that are also shown in previous figures are labeled with the same numerical labels with which the components are labeled in the previous figures. In the interest of brevity, descriptions of these components will not be repeated.

Incoming signal lines from the RS232 connection include the data terminal ready ("DTR") signal line 502, the ready to send ("RTS") signal line 504, and the receive ("RXD") signal line 506. Each of these input signal lines 502, 504, and 506 branches in order to enter both the RS232 receiver 508 as well as the power supply 510. The RS232 receiver 508 transforms the input signals into positive voltage digital signals and passes the digital signals to the microprocessor 102 via digital signal lines 512, 514, and 516. When the LHTD transmits communications data via the RS232 connection, the microprocessor 102 sends digital signals through the digital signal output line 106 to the RS232 driver 518, which outputs the digital signals through the RS232 transmit signal line ("TXD") 520. Additional handshake ("HS") signals 522 are transmitted from the LHTD to the RS232 connection. In this application the LHTD uses the HS signals for both data transmission or communications synchronization and as a power source.

Figure 6:
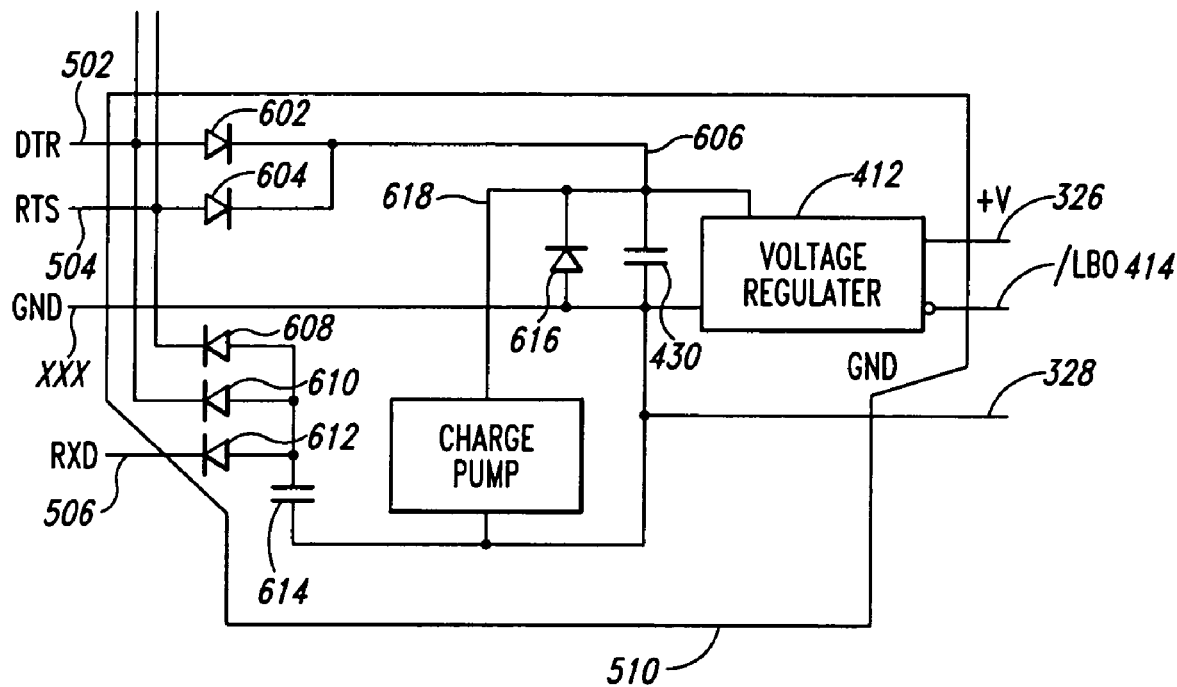
FIG. 6 is a block diagram of the power supply used when the LHTD is coupled to an RS232 connection.

FIG. 6 is a block diagram of the power supply used when the LHTD is coupled to an RS232 connection. This specialized power supply is able to draw constant positive voltage from the RS232 connection, regardless of the polarity of the incoming signal lines. The components shown in FIG. 6 that are also shown in previous figures are labeled with the same numerical labels used in the previous figures. In the interest of brevity, descriptions of these components will not be repeated.

When the incoming DTR 502 and RTS 504 signal lines have positive voltage, current passes through diodes 602 and 604 through signal line 606 to a capacitor 430 and voltage regulator 412. However, when the polarity of signal line DTR 502 and RTS 504 are reversed, current from signal lines DTR 502 and RTS 504, as well as current from signal line RXD 506, flows through diodes 608, 610, and 612, respectively, to capacitor 614. The negative charge stored in capacitor 614 flows through charge pump 616 and is output via signal path 618 to capacitor 430 and voltage regulator 412. Charge pump 616 transforms input current with negative voltage to an output current with positive voltage. Capacitors 614 and 430 store electrical energy obtained from the RS232 connection and release that electrical energy to the voltage regulator 412, which produces a constant output voltage on output signal line 326. When insufficient electrical power is available from the RS232 connection, and the capacitors are depleted, the voltage regulator outputs a LBO signal 414 to microprocessor 102. In response to the LBO signal, microprocessor 102 coordinates the transition of the internal components of the LHTD, including microprocessor 102, to sleep states until sufficient electrical power is available to power their operation. Capacitor 430 is essentially a buffer, smoothing out small interruptions in the availability of electrical power from the RS232 line. Under normal conditions, the power supply settles into a steady state and produces a constant voltage output.

In one embodiment, the LHTD may be coupled both to a local computer via an RS232 or USB link and, at the same time, to a telecommunications link. Because the voltage supplied by the former link is positive with respect to ground, and the voltage supplied by the latter link is negative with respect to ground, the LHTD, in this embodiment, requires optical coupling, level shifting, or other type of coupling in order to draw current from both types of links.

Figure 7:
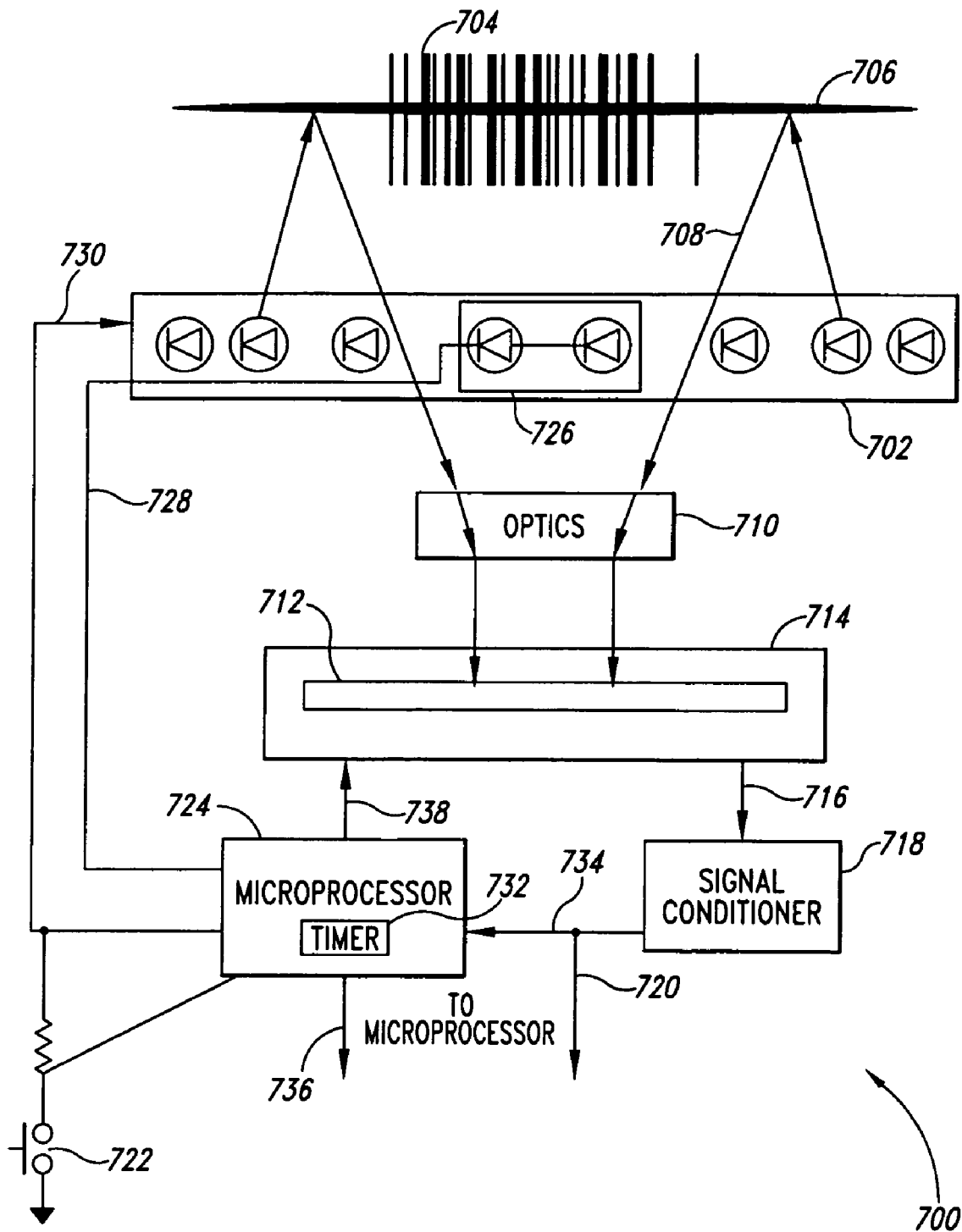
FIG. 7 is a block diagram of one embodiment of a low-power-consuming barcode reader.

FIG. 7 is a block diagram of one embodiment of a low-power consuming barcode reader. Many common barcode readers consume more electrical energy than is available to the LHTD through a telecommunications link. Consequently, a low-power barcode reader is included in one embodiment of the LHTD. An example of one low-power barcode reader 700 illuminates LEDs within in a bank of LEDs 702 in order to illuminate a target barcode 704. The emitted light produces a concentrated, horizontal beam 706 across the target barcode 704. A portion of the beam 706 is reflected back to the barcode reader 708 and focused by an optical element 710. The focused light then falls unto the window 712 of a CCD or CMOS image sensor 714 that generates electrical signals corresponding to the patterns of light and dark bands reflected from the target barcode 704. The electrical signals from the CCD or CMOS image sensor 714 are then output through signal line 716 to signal conditioner 718, which outputs, via output line 720, a digital signal to the microprocessor 102 that corresponds to the barcode. The low-power barcode reader can be activated by pressing a push button trigger 722. Activation of the push button trigger 722 awakens a low-power microprocessor 724 within the low-power barcode reader 700. The low-power microprocessor 724 illuminates a small number of centrally positioned LEDs 726 within the bank of LEDs 702 via signal line 728 and illuminates the other LEDs within the bank of LEDs 702 via signal line 730. The low-power microprocessor 724 includes a timer 732. The low-power microprocessor 724 receives digital signals from the signal conditioner 718, via digital signal line 734, and sends digital signals to the microprocessor 102, via digital signal output line 736.

Illuminating the majority of LEDs within the bank of LEDs 702 draws a comparatively large amount of current. This comparatively large number of LEDs may not be continuously operated from the electrical power obtained from a telecommunications link. Instead, the power management strategy optionally incorporated in the low-power barcode reader attempts to avoid activating the majority of LEDs within the bank of LEDs 702 until a target barcode 704 is sufficiently well positioned with respect to the position of the light beam 706 to enable a reliable reading of the target barcode 704. When the push button trigger 722 is pushed, the low-power microprocessor 724 is awakened and sends a signal through signal line 728 to activate the small number of centralized LEDs 726 that together comprise a proximity detector. Illuminating only a few of the LEDs within the bank of LEDs 702 draws much less current and enables the LHTD to operate for longer periods under the power constraints imposed by the telecommunications link. The optional proximity detector LEDs 726 produces, in addition, a much smaller beam of light 706, which has the added advantage of serving as an optical pointing device to properly center the target barcode for reflecting light into the optical element 710.

The low-power microprocessor 724 activates the CCD 714 via signal line 738 to process reflected light from the proximity detector 726, monitoring the output 734 of the signal conditioner 718 to determine whether sufficient reflected light energy is available to take a barcode reading. If insufficient reflected light is available, the microprocessor returns to a sleep state after setting timer 732 and reawakens to again monitor output of the signal conditioner 718. Thus, the low-power microprocessor 724 need not operate continuously during the course of target barcode acquisition. When sufficient reflected light is available, the low-power microprocessor 724 causes the majority of LEDs within the bank of LEDs 702 to be illuminated to produce a sufficiently strong beam 706 to make a barcode reading. Output from the signal conditioner 718 as a result of illumination of the majority of the LEDs within the bank of LEDs 702 is passed by the low-power microprocessor 724 to the LHTD microprocessor 102 after the low-power microprocessor 724 first awakens the LHTD microprocessor 102. The LHTD microprocessor 102 then processes the digital signal from the signal conditioner 718. If a barcode is successfully read by the LHTD microprocessor 102, then the LHTD microprocessor 102 prepares a request based on the barcode and sends the request to a server computer over the telecommunications link. If, on the other hand, a barcode is not successfully read, then the LHTD microprocessor 102 returns to a sleep state, the bank of LEDs 702 is turned off, and the entire process of target acquisition via the proximity detector can be repeated. Thus, the low-power barcode reader conserves comparatively large amounts of electrical energy in comparison to a standard barcode reader by illuminating the majority of LEDs within the bank of LEDs 702 only when the chance for successfully reading a barcode is high, activating the LHTD microprocessor 102 only when a sufficiently strong signal is available from the signal conditioner 718. The low-power microprocessor 724 may even cursorily analyze the output from the signal conditioner 718 to determine whether a sufficient number of light and dark regions are present to indicate a barcode prior to waking up the LHTD microprocessor 102. In an alternate embodiment, the low-power microprocessor 724 may interpret the barcode, rather than pass the signal from the signal conditioner 718 to the LHTD microprocessor 102. Alternate embodiments of the low-power barcode reader employ a separate proximity detector, rather than selectively illuminating a small number of LEDs 726 within the bank of LEDs 702. Alternate embodiments of a CCD bar code scanner may achieve the requirements of a low power CCD scanner without a proximity detector. These embodiments include strobing the light source and other techniques to manage power requirements. Alternate embodiments of the low-power bar code reader may include single point LED readers, low-power CCD readers or low power laser readers.

Figure 8:
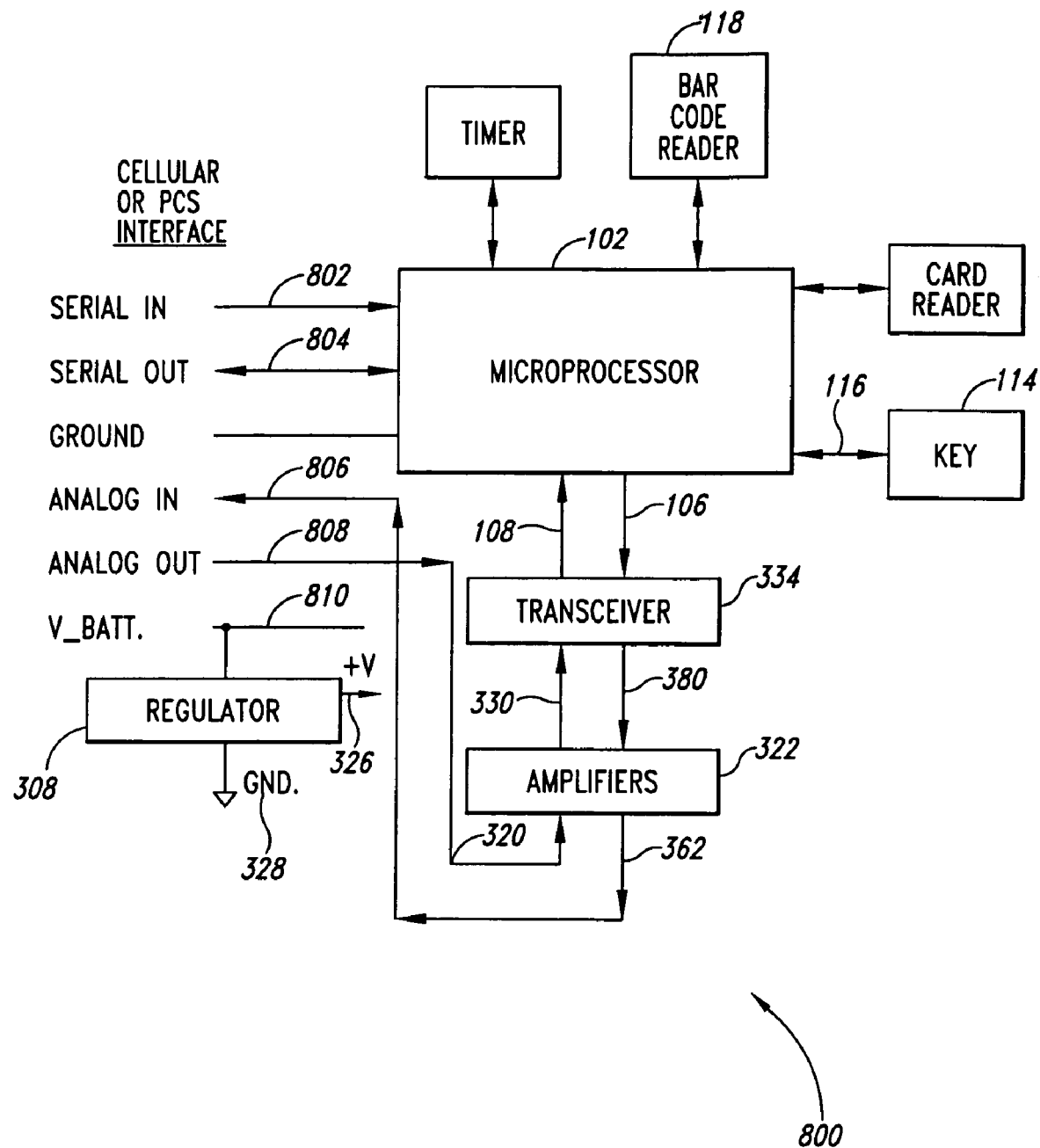
FIG. 8 is a block diagram of the LHTD connected to a cellular/PCS telephone.

FIG. 8 is a block diagram of the LHTD connected to a cellular/PCS telephone. The components shown in FIG. 8 that are shown in previous figures are labeled with the same numerical labels with which they are labeled in the previous figures. In the interest of brevity, descriptions of these components will not be repeated.

When a LHTD is connected to a cellular telephone or a PCS telephone, either type of telephone referred to below as a "cellular" telephone, the LHTD may not require a visual display device, a keypad, a microphone or a speaker, since the LHTD can make use of the visual display, keypad, microphone, and speaker included in the cellular telephone. In addition, the LHTD may obtain electrical power through the accessory connector of the cellular telephone. In the case of a cellular telephone that exports digital signals, the LHTD may not require a separate modem. In yet another embodiment, the microprocessor of the LHTD may be used to provide processing capabilities to the cellular telephone so that the cellular telephone need not include a separate microprocessor.

The LHTD embodiment 800 shown in FIG. 8 receives digital input signals 802 from the cellular telephone and transmits digital signals 804 to the cellular telephone. These digital signals enable the LHTD to control the visual display of the cellular telephone and to intercept and respond to keypad-initiated signals from the cellular telephone. In fact, each key and display element of the cellular telephone may be separately manipulated by specific commands transmitted from the microprocessor of the LHTD 102 through digital output 804. The LHTD receives analog signals from the cellular telephone through analog output 808 and returns analog signals to the cellular telephone through analog input 806. These analog signals correspond to normal telephone analog signals and are processed by the LHTD just as the telephone signals in FIG. 3 are processed by the embodiment of the LHTD shown in FIG. 3. The power supply 308 for the LHTD obtains electrical power from the accessory port 810 of the cellular telephone, regulates the supplied current, and outputs a constant voltage via power output 326. In this embodiment, the LHTD relies on the cellular telephone to send and receive signals for a telecommunications link. In an alternate embodiment, the communication signals 806 and 808 may be supplied and received as digital signals rather than analog signals. In the alternate embodiment, amplifier 322 and transceiver 334 would not be needed, but a codec would be required for digital/analog conversion. In other, embodiments the LHTD is built into the wireless phone. In this embodiment, components such as key pad, display, battery, audio circuits and micro-processors may be shared by both the wireless phone and the LHTD.

Figure 9:
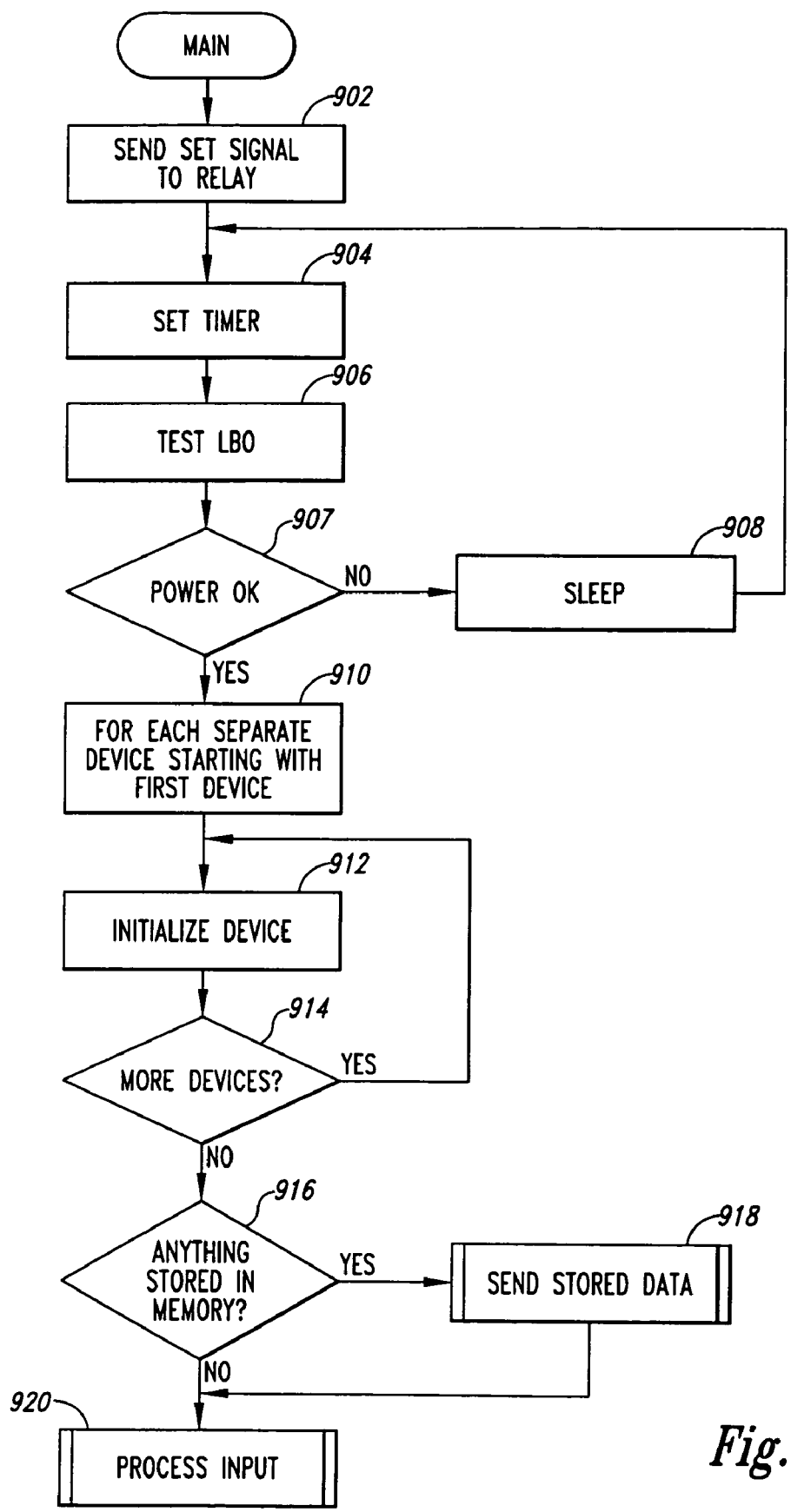
FIG. 9 is a flow control diagram for the main firmware routine.

FIGS. 9-13 are flow control diagrams that describe the firmware routines executed by the LHTD microprocessor 102. FIG. 9 is a flow control diagram for the main firmware routine. The firmware routine "main" begins executing when the LHTD microprocessor 102 is powered up by, for example, depressing pushbutton 420 in FIG. 4. The firmware routine "main" begins executing at step 902. In step 902, main sends a SET signal to relay 314 in order to activate the relay to begin drawing current from the telecommunications link. In step 904, main sets a timer to reawaken itself in the event that main enters a sleep mode in step 908, below. In step 906, main tests the LBO signal to determine whether a dependable power supply is now being generated by the power supply 308. If main determines that the power supply is not yet sufficient to operate the components of the LHTD, in step 907, control flows to step 908, in which main enters a sleep mode and is eventually reawakened by the timer set in step 904. Once reawakened, main begins executing again at step 904. If main determines that the power is sufficient then, in step 907, main initializes all the components within the LHTD in the loop represented by steps 910, 912, and 914. In step 916, main determines whether there is any request data stored in nonvolatile memory. If there is request data stored in nonvolatile memory, then in step 918, main retrieves the request data from nonvolatile memory, formats the request data into one or more requests, opens communications with a remote server over the telecommunications link, ensures that the communications connection with the remote server is secure, and then sends the formatted requests and receives the appropriate responses from the server computer and displays them. This access of stored request data and execution of transactions based on the stored request data in steps 916 and 918 allow the LHTD to be used, off line, to input request data and store the request data for subsequent use. If, in step 918, a connection cannot be established through the telecommunications link to the remote server, then the request data continues to be stored in nonvolatile storage until a later time. Finally, in step 920, main executes the firmware routine "process_input" to begin processing input to the LHTD.

Figure 10:
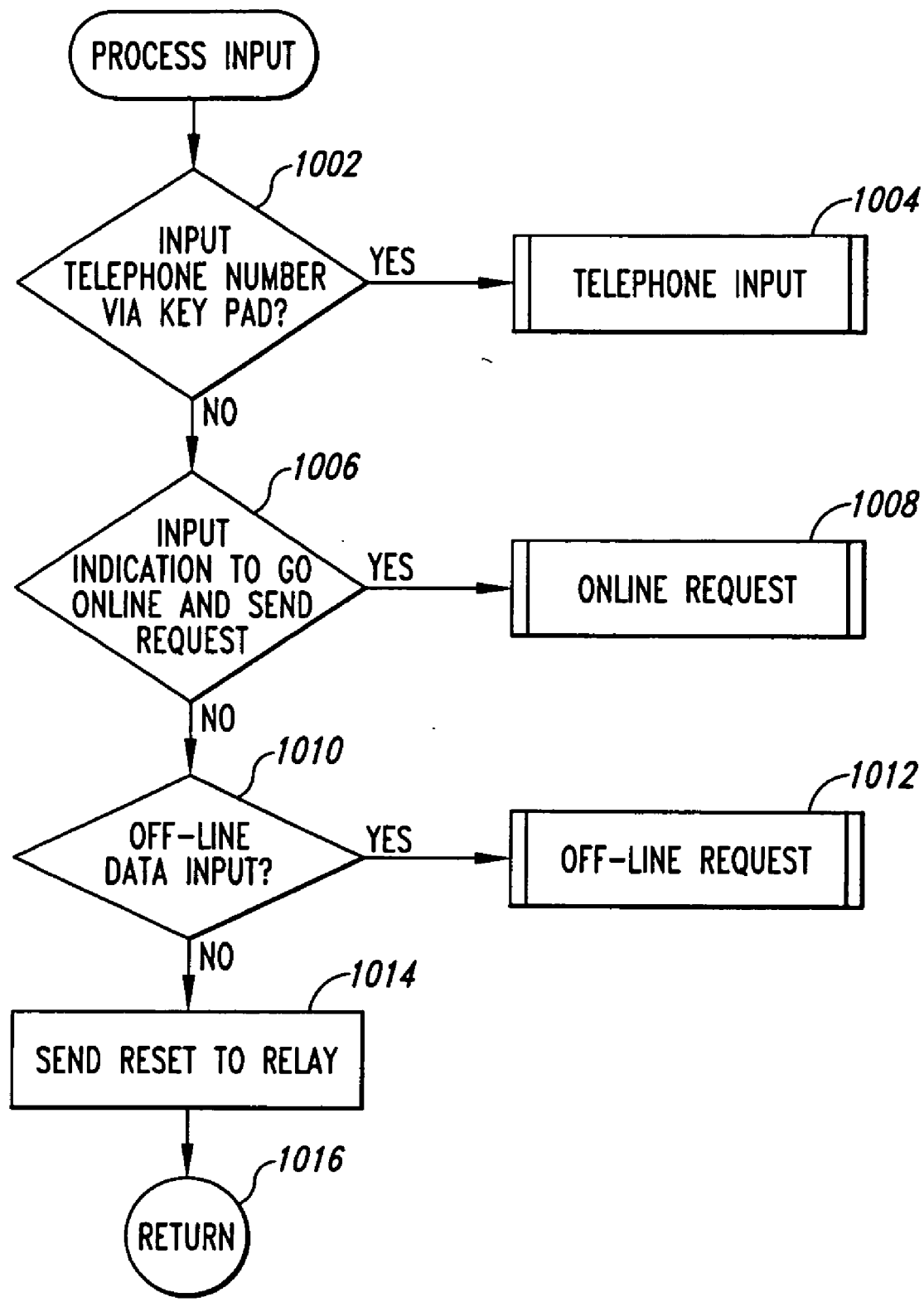
FIG. 10 is a flow control diagram for the firmware routine "process_input."

FIG. 10 is a flow control diagram for the firmware routine "process_input." The firmware routine "process_input" basically determines the nature of the input data that will be input to the LHTD and calls an appropriate firmware routine to handle that type of input data. If process_input determines, in step 1002, that a user is inputting a telephone number through the keypad, then process_input calls the firmware routine "telephone_input," in step 1004, to establish a point-to-point telephone link in accordance with the user's request. If, on the other hand, process-input determines in step 1006 that the user has input an indication to go on-line and send requests based on request data input through one of the input components of the LHTD, then process_input calls the firmware routine "on-line request" in step 1008. Alternatively, if process_input determines, in step 1010, that the user has activated one of the input components directly in order to input request data that will be stored in memory, i.e., the user desires to use the LHTD off-line, then, in step 1012, process_input calls the firmware routine "off-line_request." If none of this type of input has been made available to the LHTD, then, in step 1014, process_input sends a RESET signal to relay 314 to deactivate the relay and then returns, in step 1016. In this later case, the LHTD microprocessor 102 will be powered down.

Figure 11:
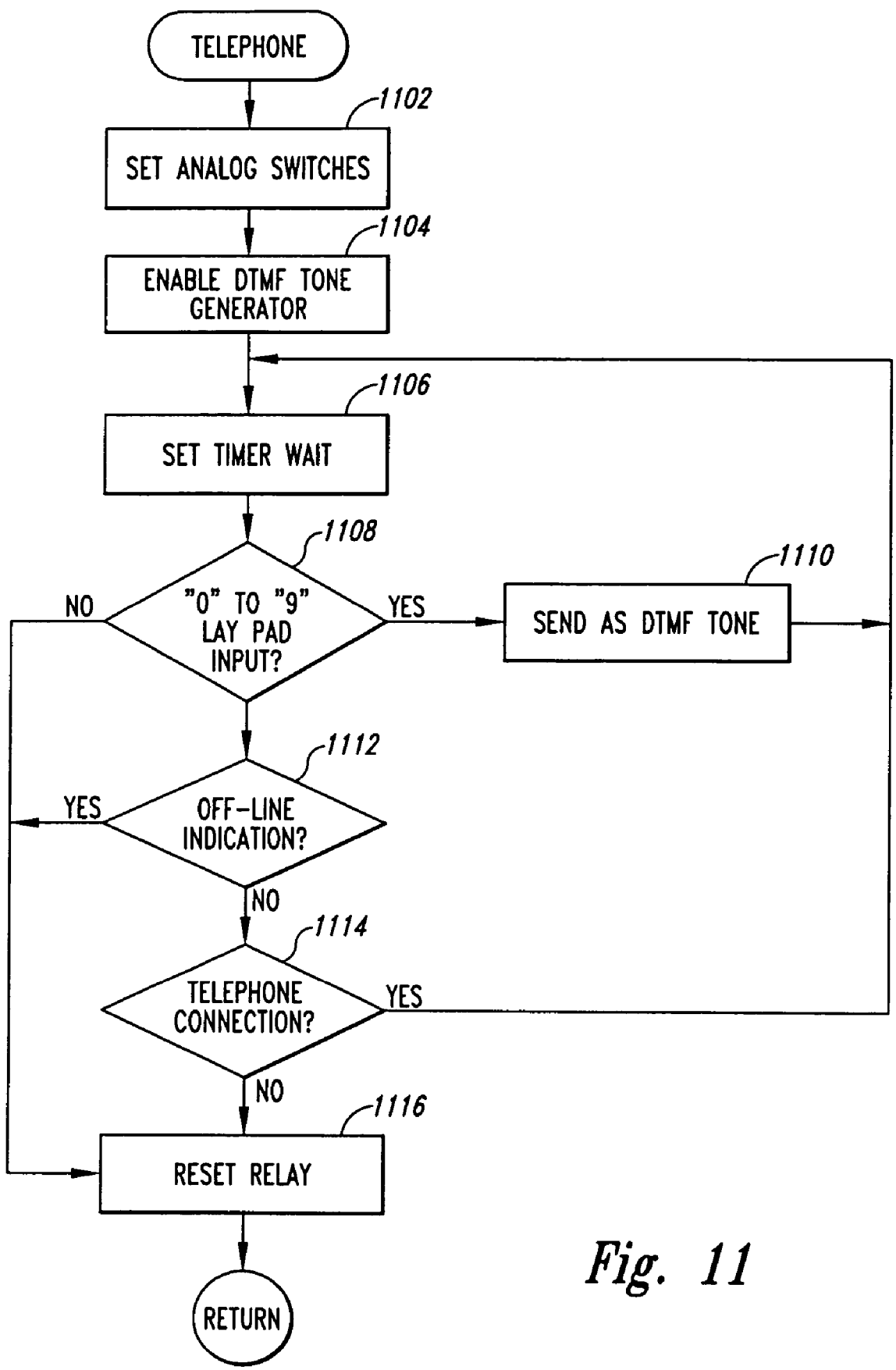
FIG. 11 is a flow control diagram for the firmware routine "telephone_input."

FIG. 11 is a flow control diagram for the firmware routine "telephone_input." In step 1102, telephone_input sets the analog switches 336, 354, 370, and 374 of FIG. 3 in order to configure the LHTD for use as a telephone. In step 1104, telephone_input enables the DTMF tone generator, discussed above. Then, in step 1106, telephone_input sets a timer and enters a wait state. After awakening, telephone_input, in step 1108, determines whether it was awakened by keypad input of a digit. If so, then, in step 1110, telephone_input sends a DTMF tone corresponding to the input digit to a telecommunications link and returns to step 1106. If not, then, in step 1112, telephone_input determines if the user has input an off-line indication to discontinue the telephone call. If so, then control flows to step 1116. Otherwise, in step 1114, telephone_input determines whether a telephone connection is still open to a remote telephone. If so, then the telephone call has not yet been completed, and control flows back to step 1106. Otherwise, telephone/input sends a RESET signal to relay 314 in step 1116, which powers down the LHTD and returns.

Figure 12:
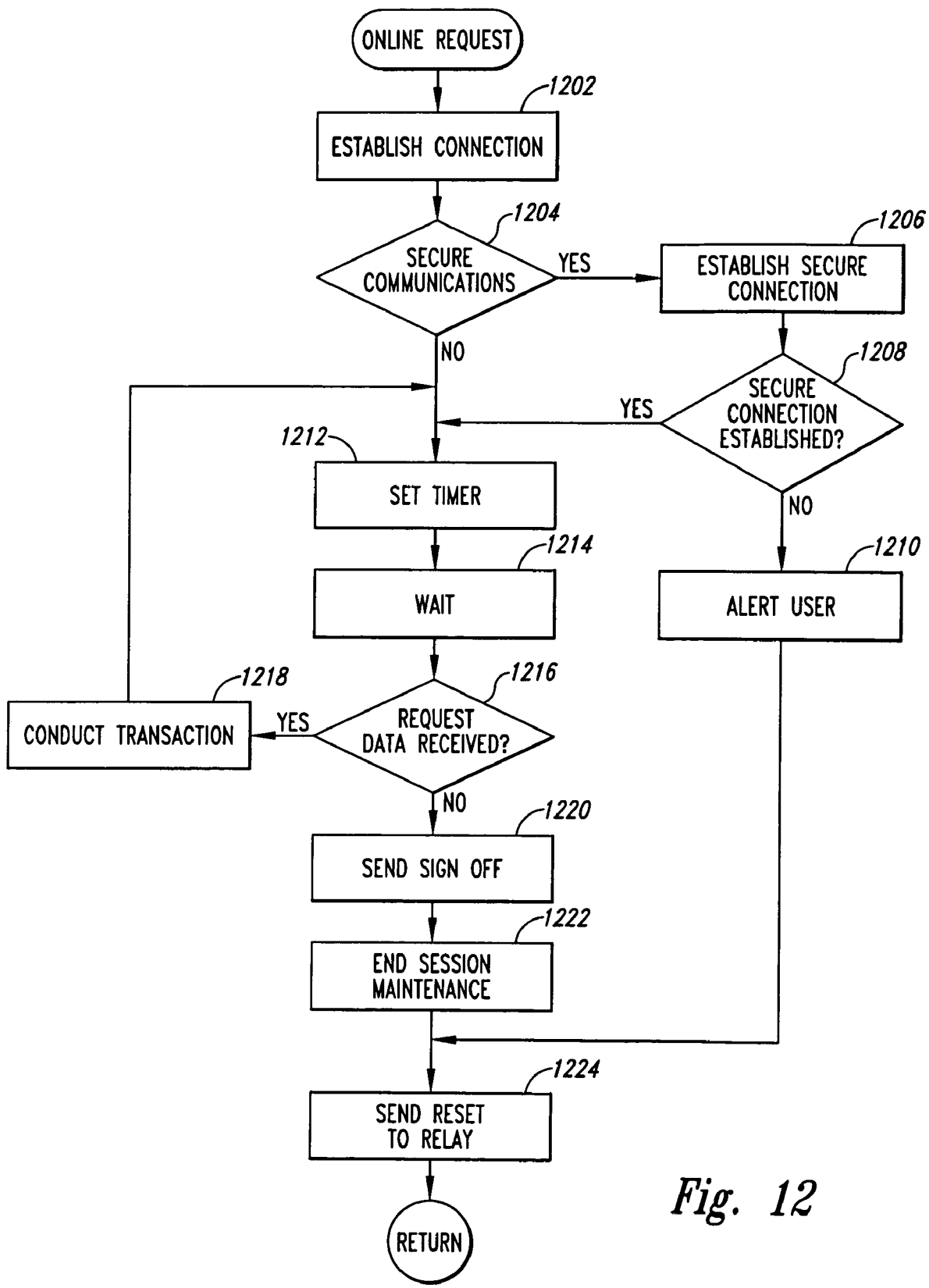
FIG. 12 is a flow control diagram of the firmware routine "on-line_request."

FIG. 12 is a flow control diagram of the firmware routine "on-line_request." In step 1202, on-line_request establishes a telecommunications connection to a remote server. This may occur in a number of different ways. In one embodiment, on-line_request may retrieve a telephone number or other communications address for the remote server, dial the telephone number, and wait for establishment of a connection between transceiver 322 and the remote transceiver of the remote server computer. Alternatively, on-line_request might cause the visual display of the LHTD to indicate to the user that a connection address must be provided, input that connection address from the keypad or barcode reader, and use that input address in order to connect to the remote server. Once a telecommunications connection has been established with the remote server, then, in step 1204, on-line_request determines whether a secure communications link needs to be established. This determination may be made from stored configuration information or may be determined by querying the user. If a secure communications link is to be established, then, in step 1206, on-line_request establishes this secure connection through a security handshake mechanism that may involve the exchange of sequence numbers and other messages between the LHTD and the server computer. In step 1208, on-line_request determines whether a secure connection was established. If so, the control flows to step 1212. If a secure communications link has not been established, control flows to step 1210, in which on-line_request alerts the user through an output component such as a visual display that a secure communications link was not established and control flows to step 1224.

If a secure communications link has been established, or when no secure communications link was necessary, on-line_request sets a timer in step 1212 and enters a wait state in step 1214. When on-line_request is awakened, then, in step 1216, on-line_request determines whether request data has been received from an input component, such as the barcode reader. If so, then, in step 1218, on-line_request formats the input request data into a request, sends that request to the remote server, waits for the response, and displays the response on one or more of the output components of the LHTD. Once the response has been displayed, control flows back to step 1212. Note that, during reception of the response from the remote server in 1218, a user may depress a button or otherwise indicate a desire to interrupt the response from the server computer in order to initiate a new transaction or initiate a point-to-point telephone call with a human operator. In the former case, step 1218 may be prematurely terminated, after which control flows back to step 1212. In the later case, a telephone connection can be established, such as in firmware routine "telephone_input," described above. If request data has not been received when on-line_request is awakened from the wait state entered in step 1214, then, in step 1220, on-line_request sends a sign off message to the server computer, and, in step 1222, conducts any end of session maintenance necessary, including storing information in nonvolatile memory, sends a RESET signal to relay 314, in step 1224, and returns. Microprocessor 102 is then powered down and executes no further firmware.

Figure 13:
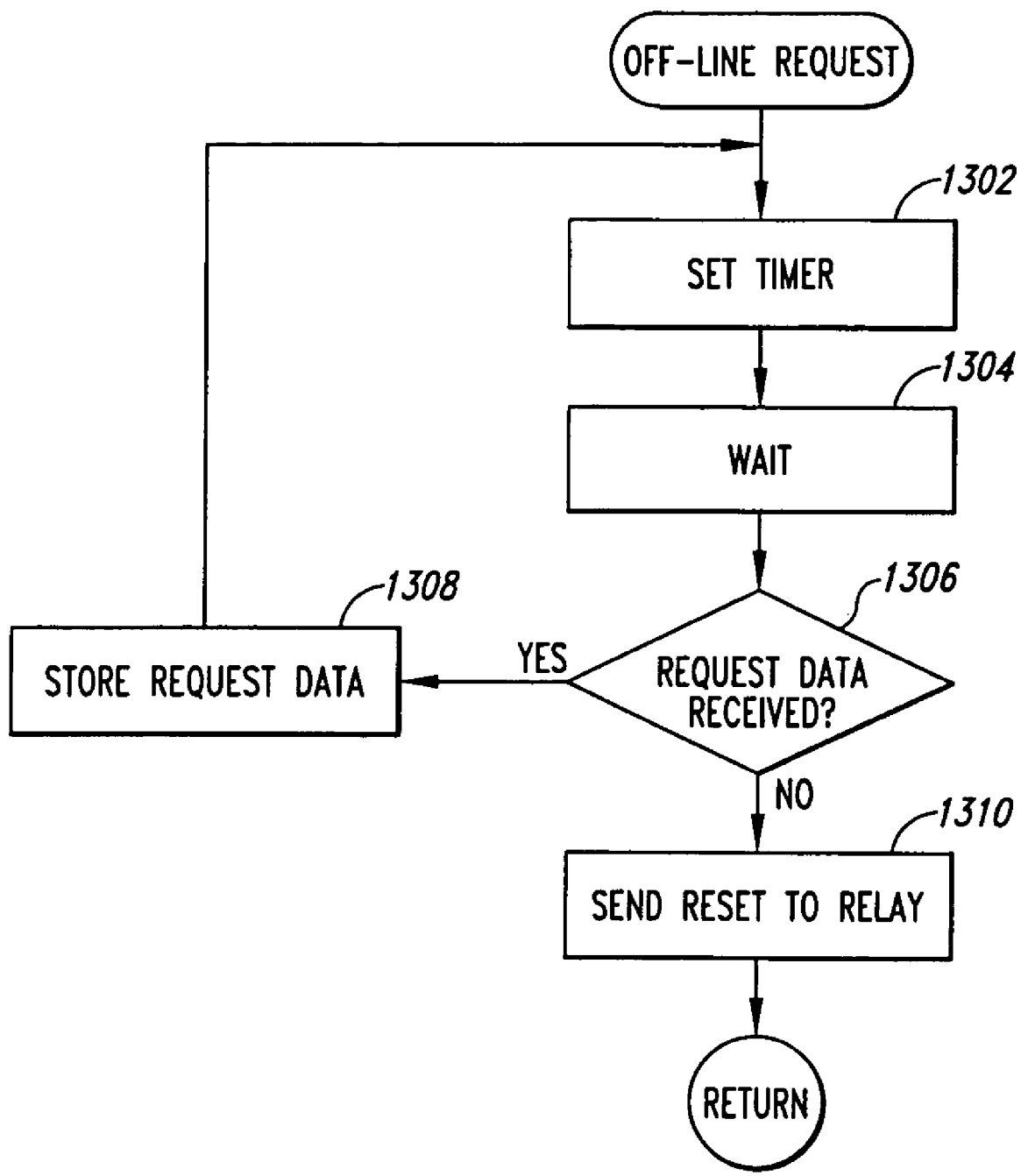
FIG. 13 is a flow control diagram for the firmware routine "off-line_request."

FIG. 13 is a flow control diagram for the firmware routine "off-line_request." In step 1302, off-line_request sets a timer and then, in step 1304, enters a wait state. When off-line_request is awakened from the wait state, it checks, in step 1306, whether any request data has been received from an input component of the LHTD. If request data has been received, then, in step 1308, off-line_request stores the request data input in nonvolatile memory and returns to step 1302 to await for additional request data. If, upon awakening from the wait state entered in step 1304, off-line_request determines that no request data has been received, then, in step 1310, off-line_request sends a RESET signal to line 314 to power down the LHTD, and returns.

The firmware routines may be implemented in many different ways. Different numbers of firmware routines may be used, and a different control flow and different steps may be employed. The above-described firmware routines represent a preferred embodiment. Additional functionality provided by the LHTD may require enhancement of, and additions to, the firmware routines.

Figure 14:
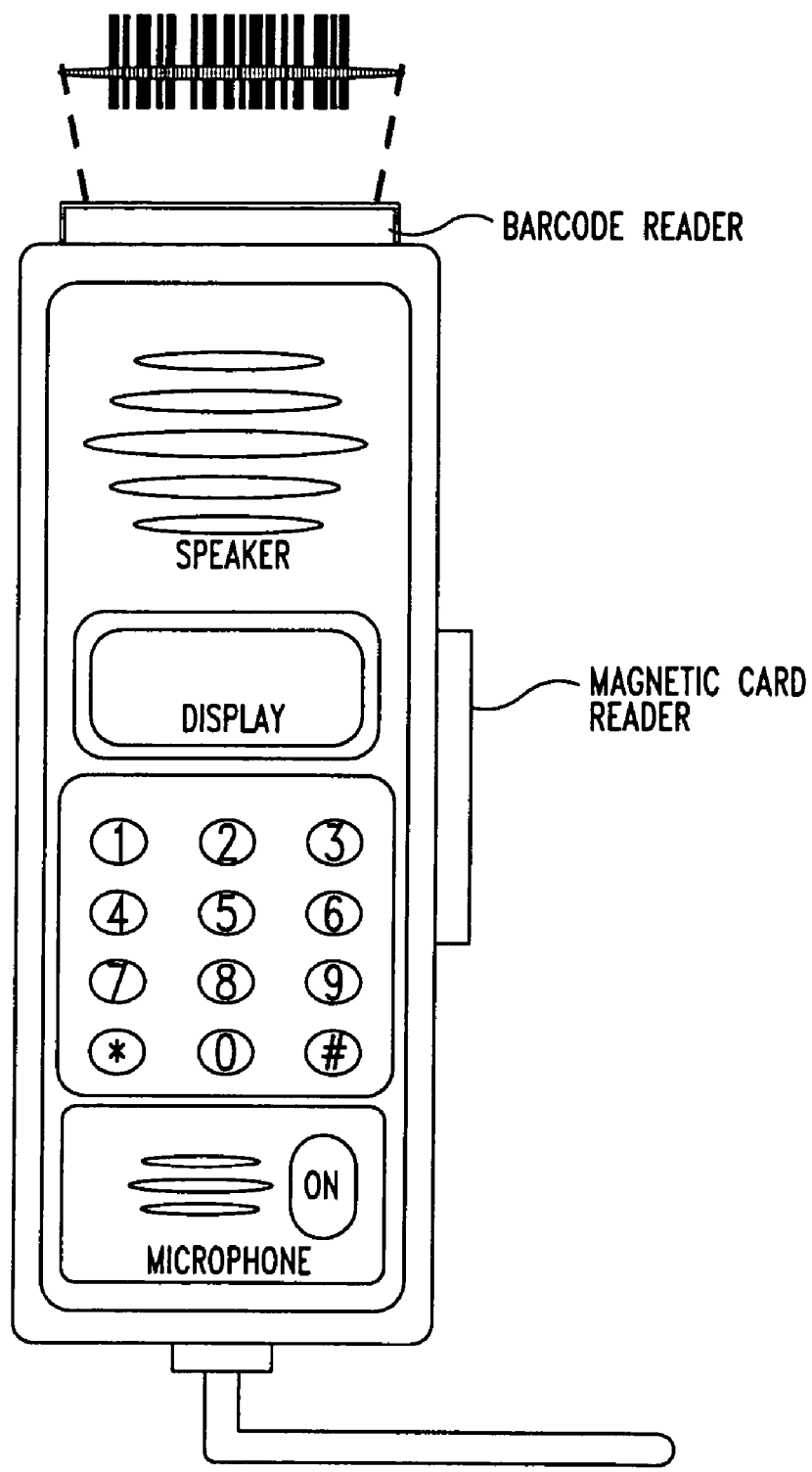
FIG. 14 illustrates the external appearance of one embodiment of the LHTD.
Figure 15:
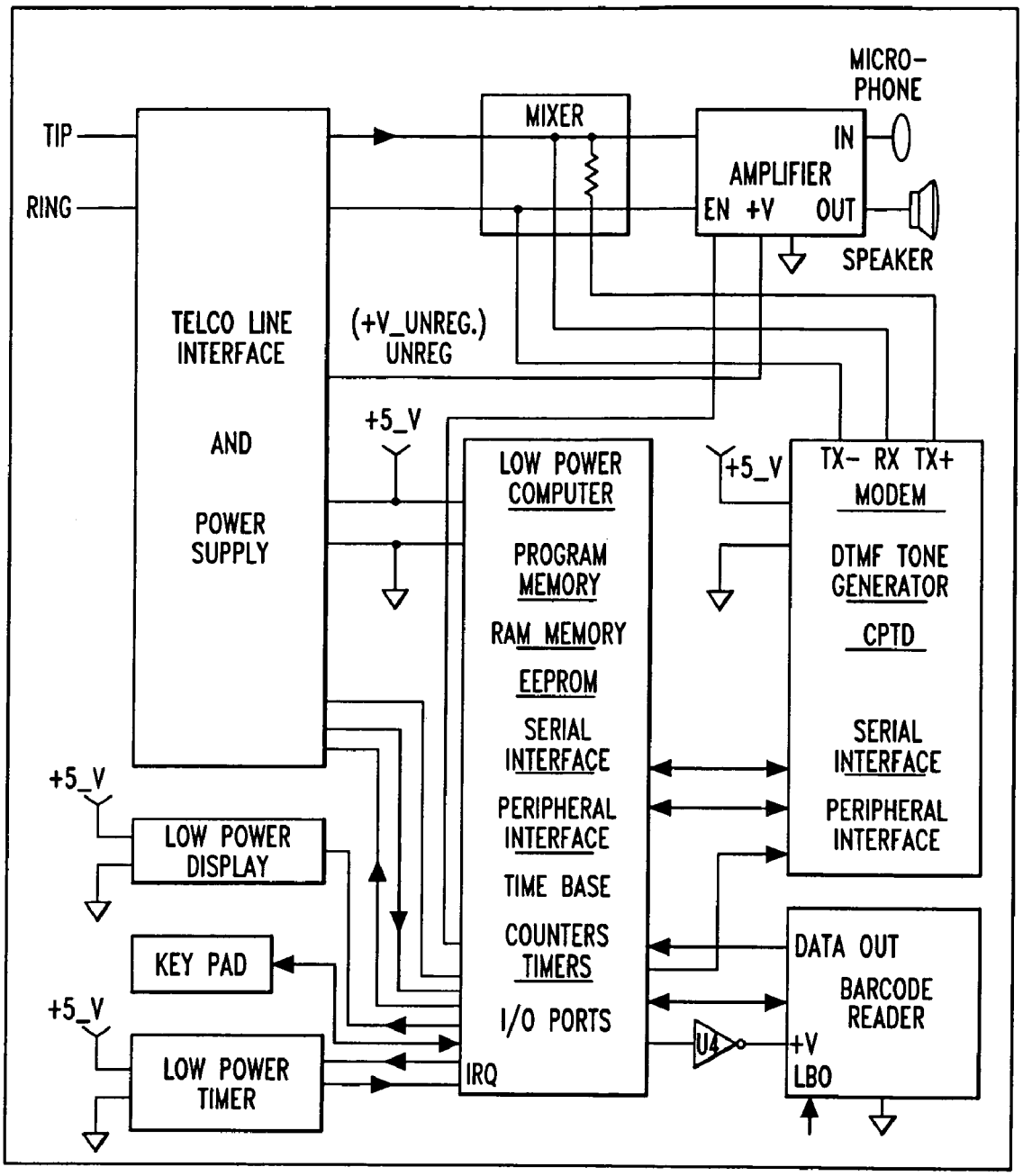
FIG. 15 is a detailed block diagram of an embodiment of a LHTD designed for connection to a telephone line.
Figure 16:
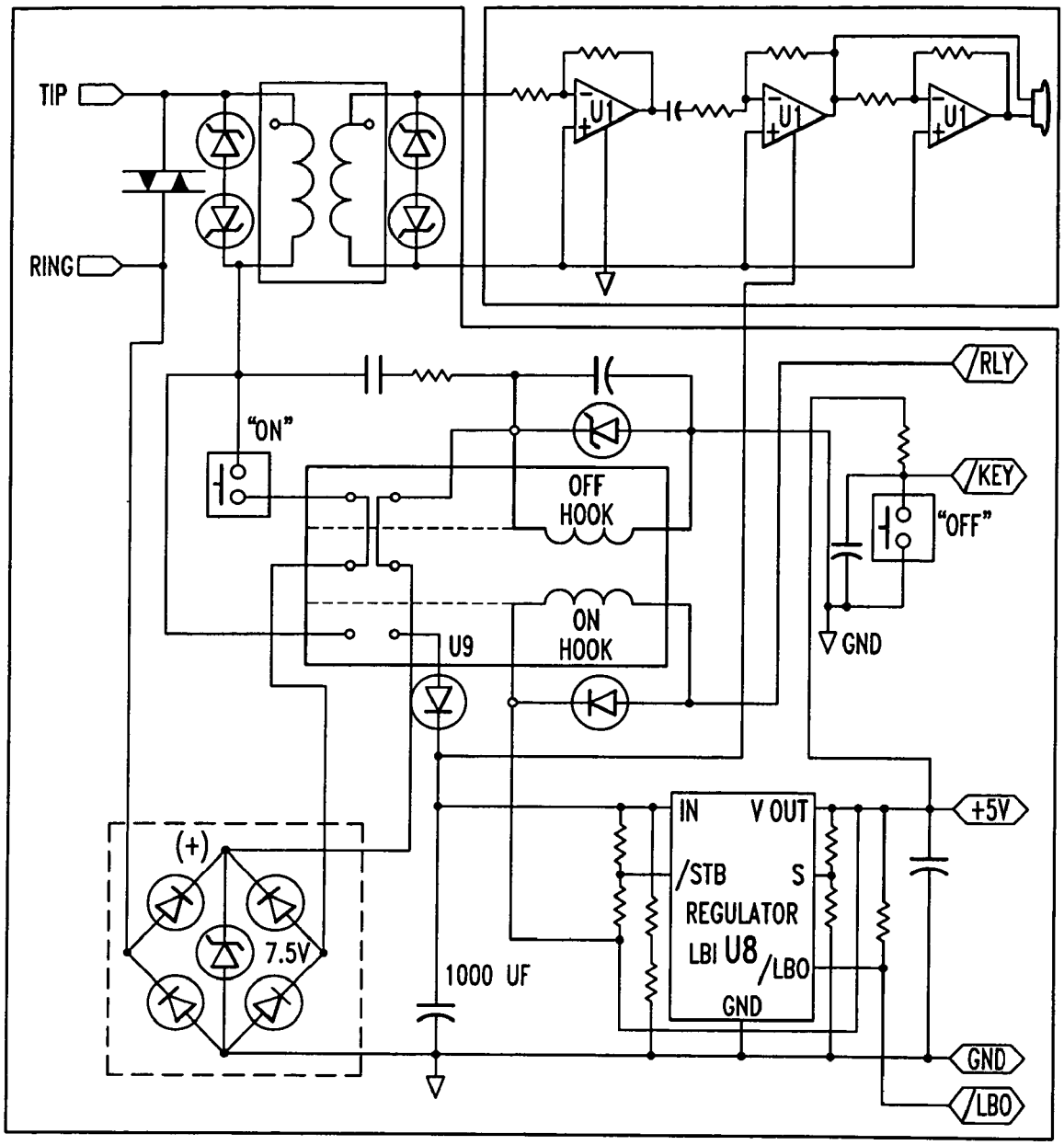
FIG. 16 is a circuit diagram for the telephone interface and power supply for the LHTD shown in FIG. 15.
Figure 17:
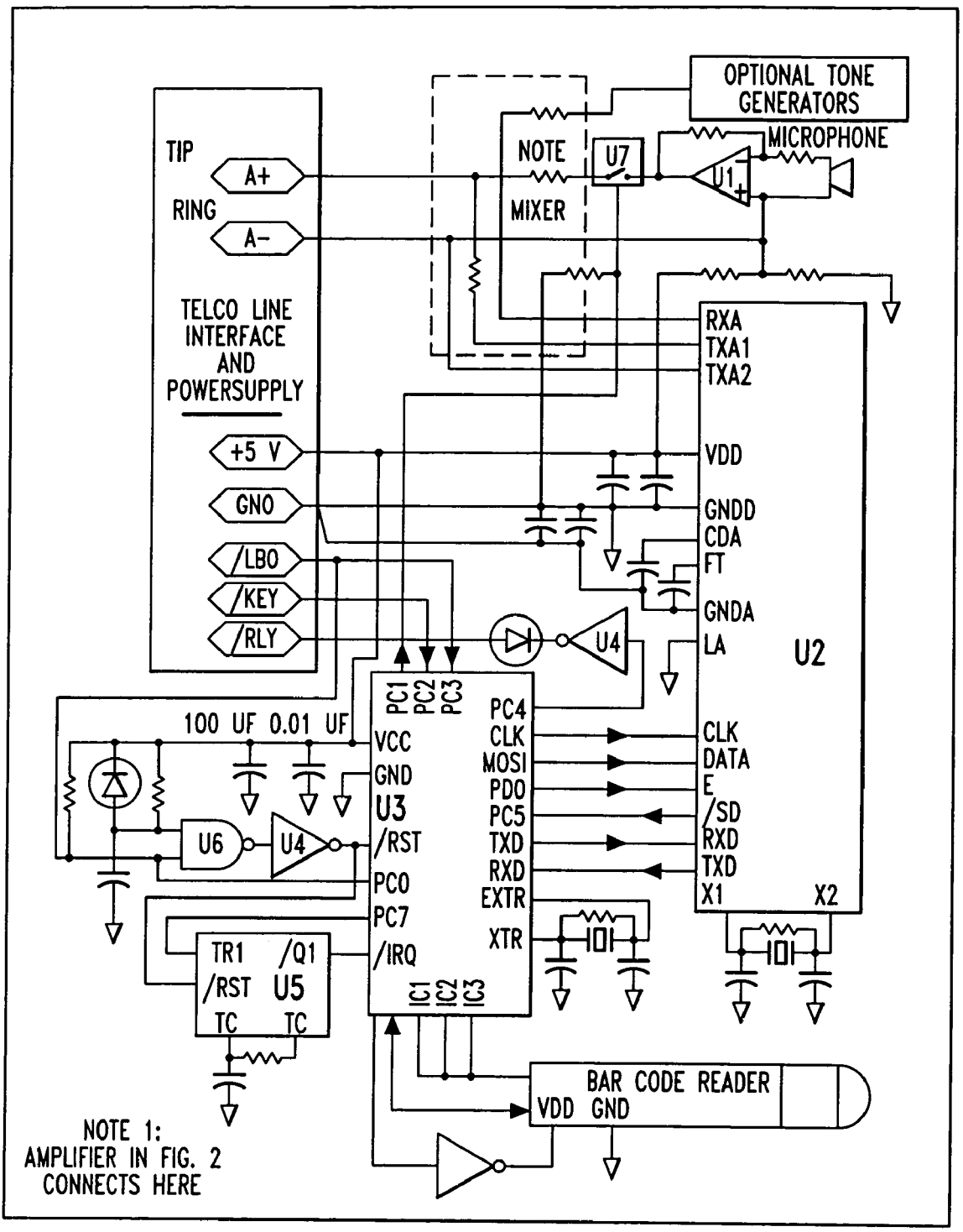
FIG. 17 is a circuit diagram for the LHTD described by the block diagram of FIG. 15.
Figure 18:
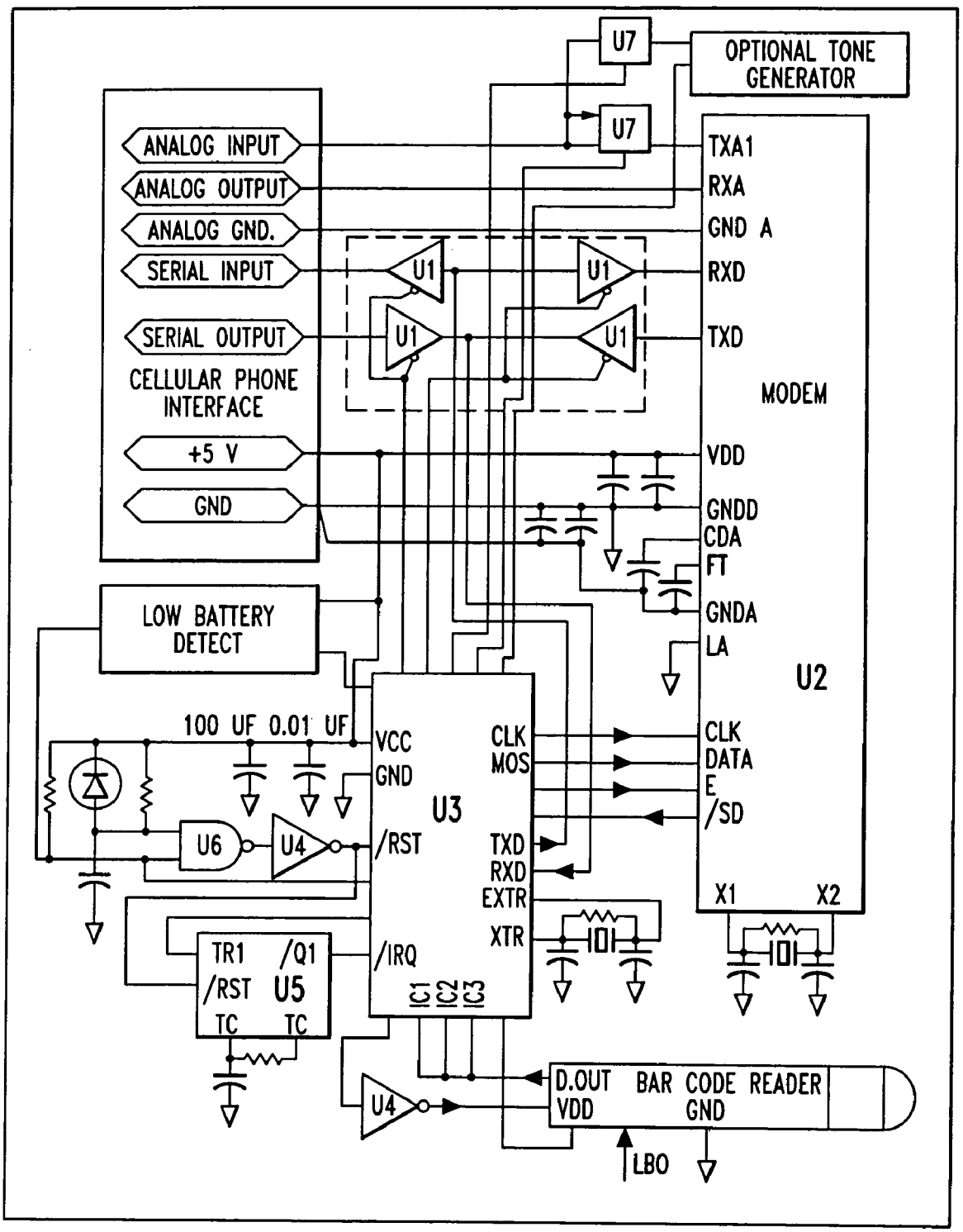
FIG. 18 is a circuit diagram for a LHTD designed to be connected to a cellular or PCS telephone.
Figure 19:
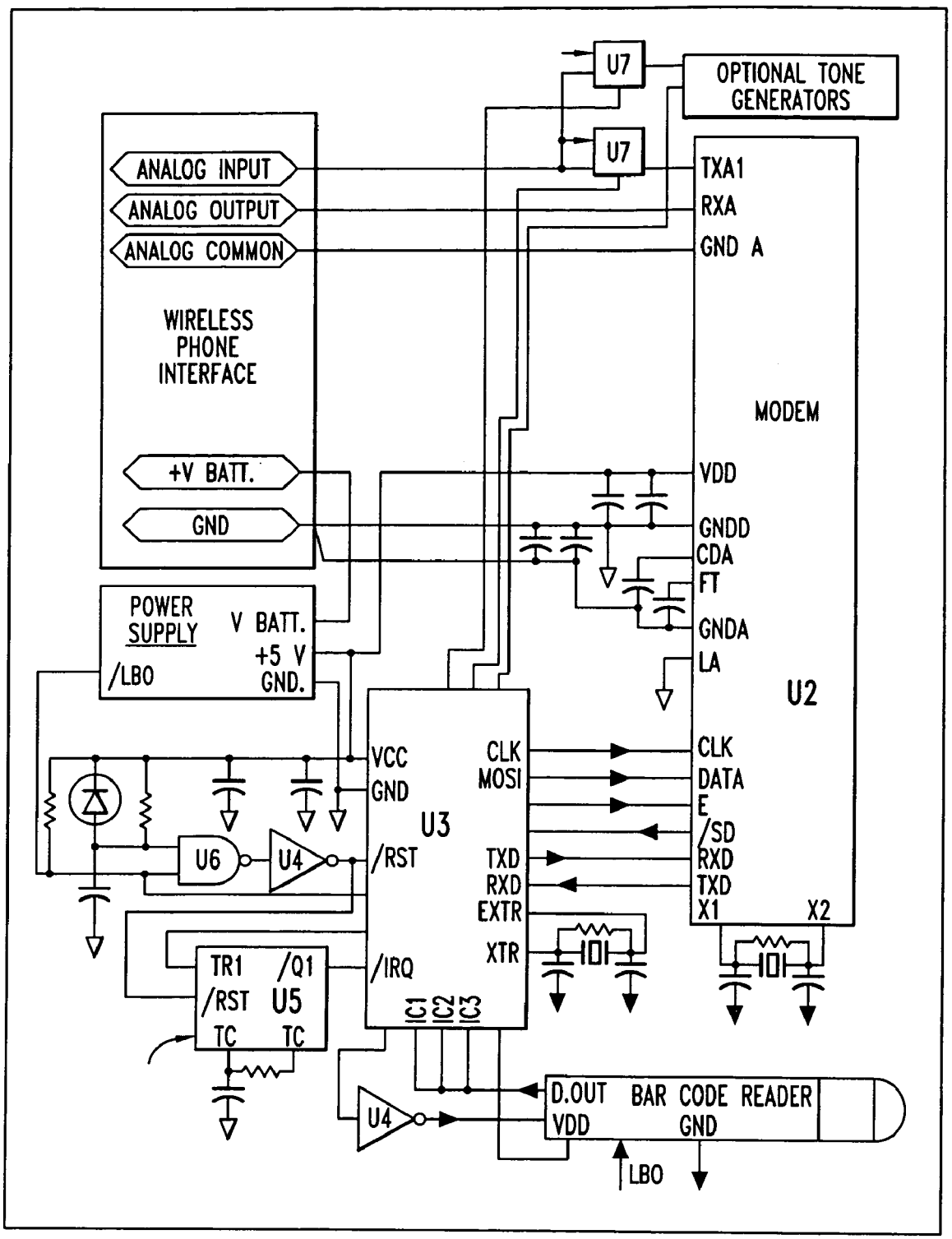
FIG. 19 is a circuit diagram for a LHTD designed to be connected to a wireless telephone.
Figure 20:
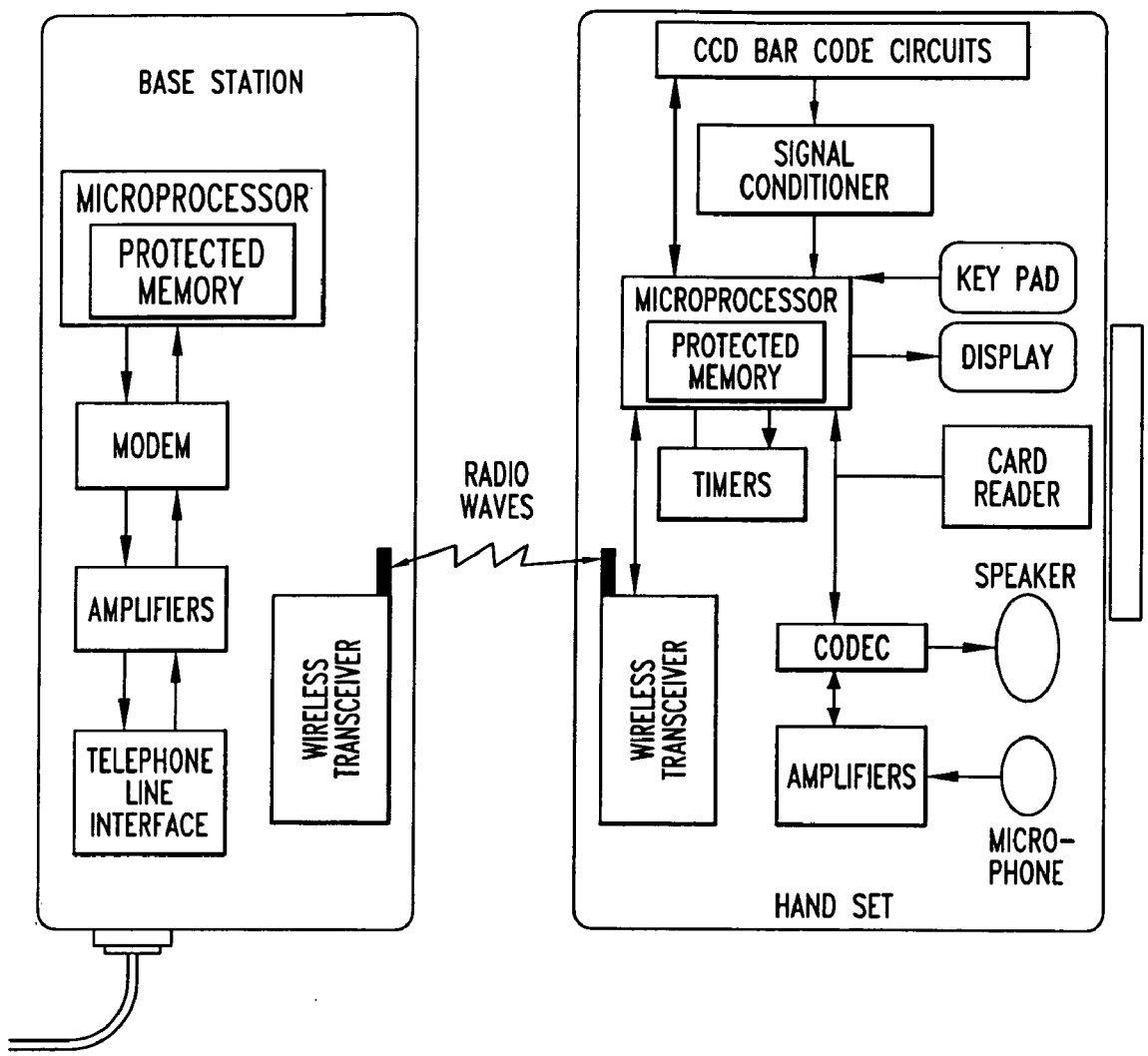
FIG. 20 is a block diagram for a two-unit LHTD designed for connection to a cordless telephone.
Figure 21:
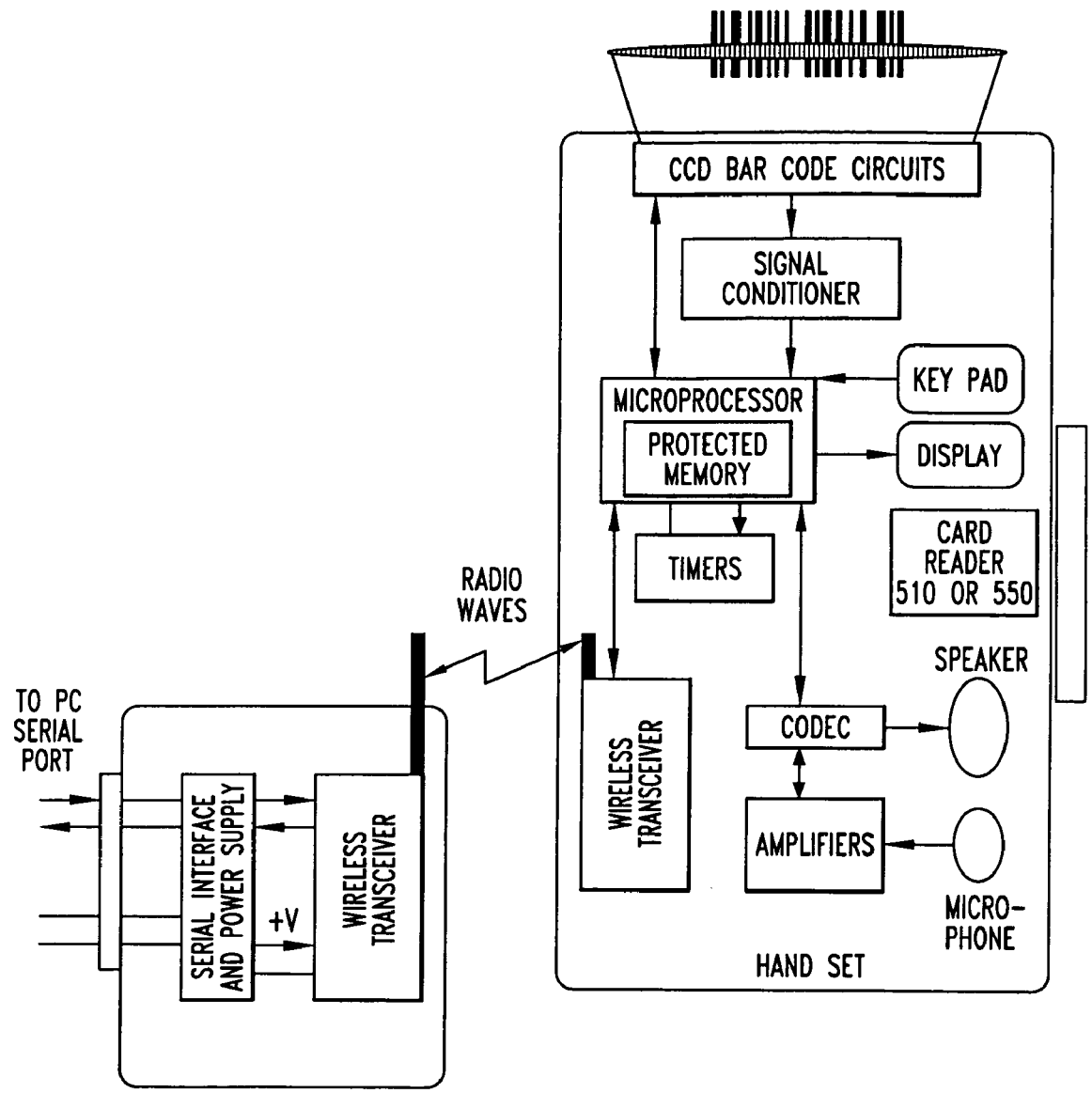
FIG. 21 is a block diagram for a wireless two-unit LHTD designed for connection to a personal computer.
Figure 22:
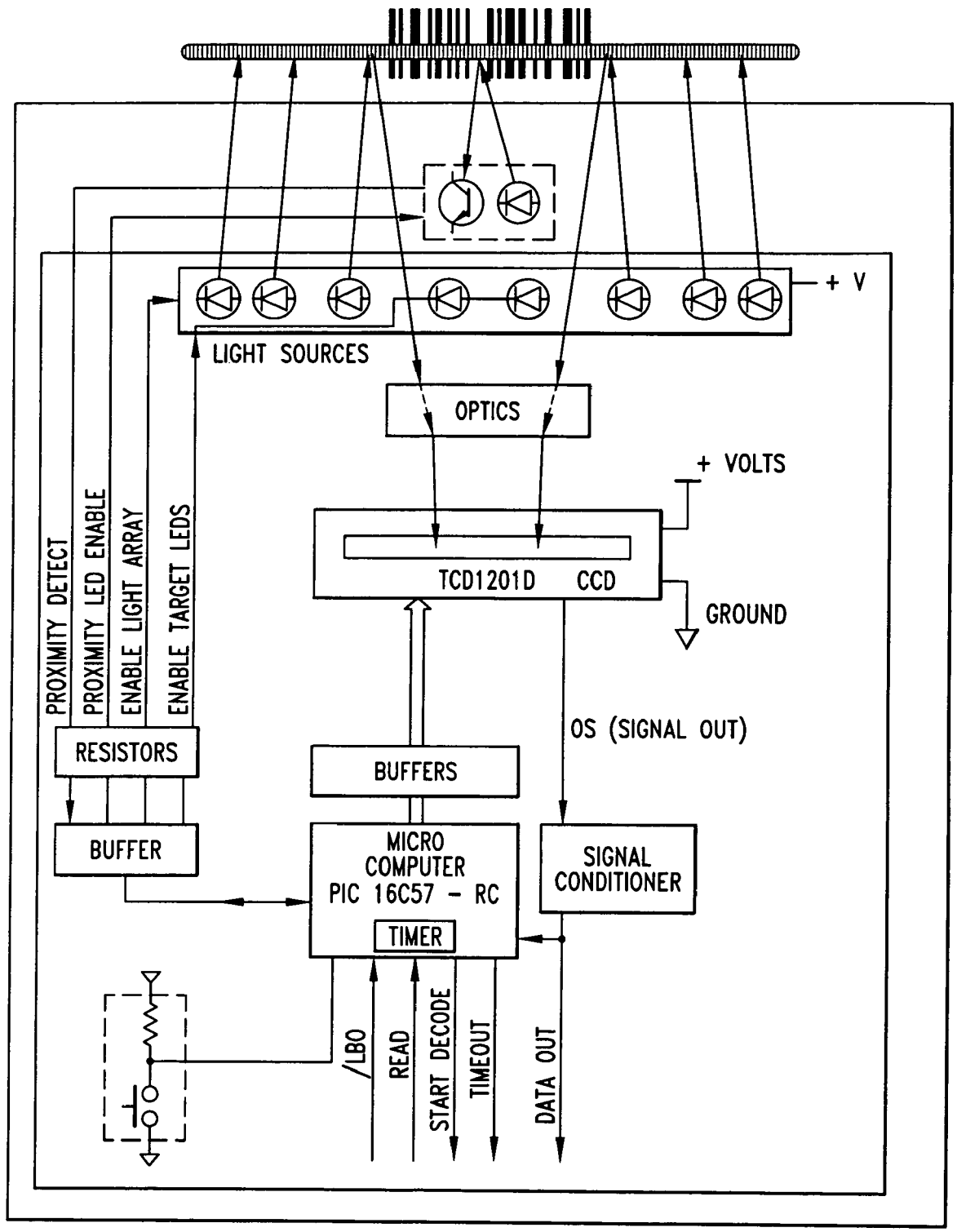
FIG. 22 is a block diagram for a barcode reader with a separate proximity detector.
Figure 23:
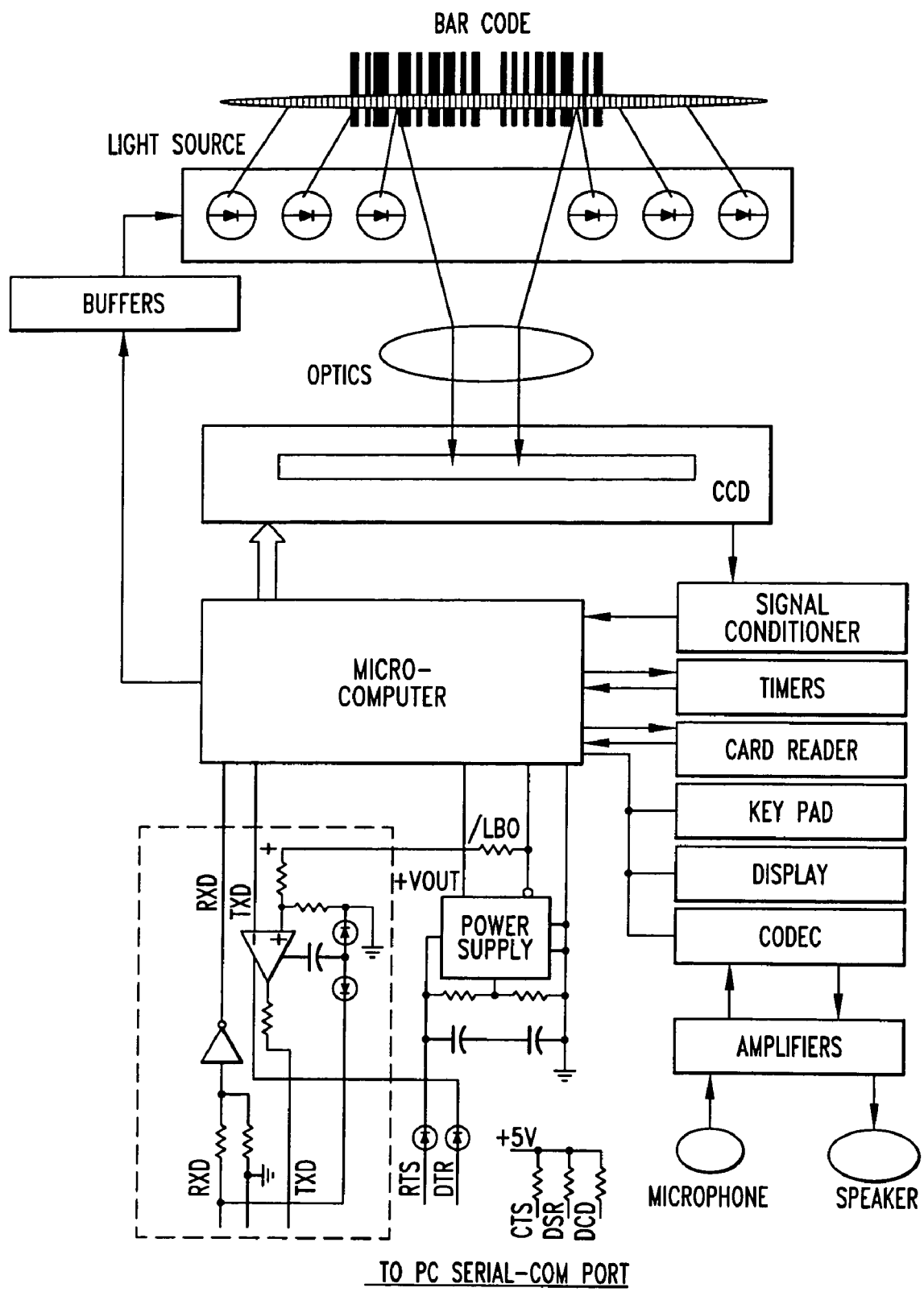
FIG. 23 is a block diagram for a LHTD communicating with and powered by a serial port.
Figure 24:
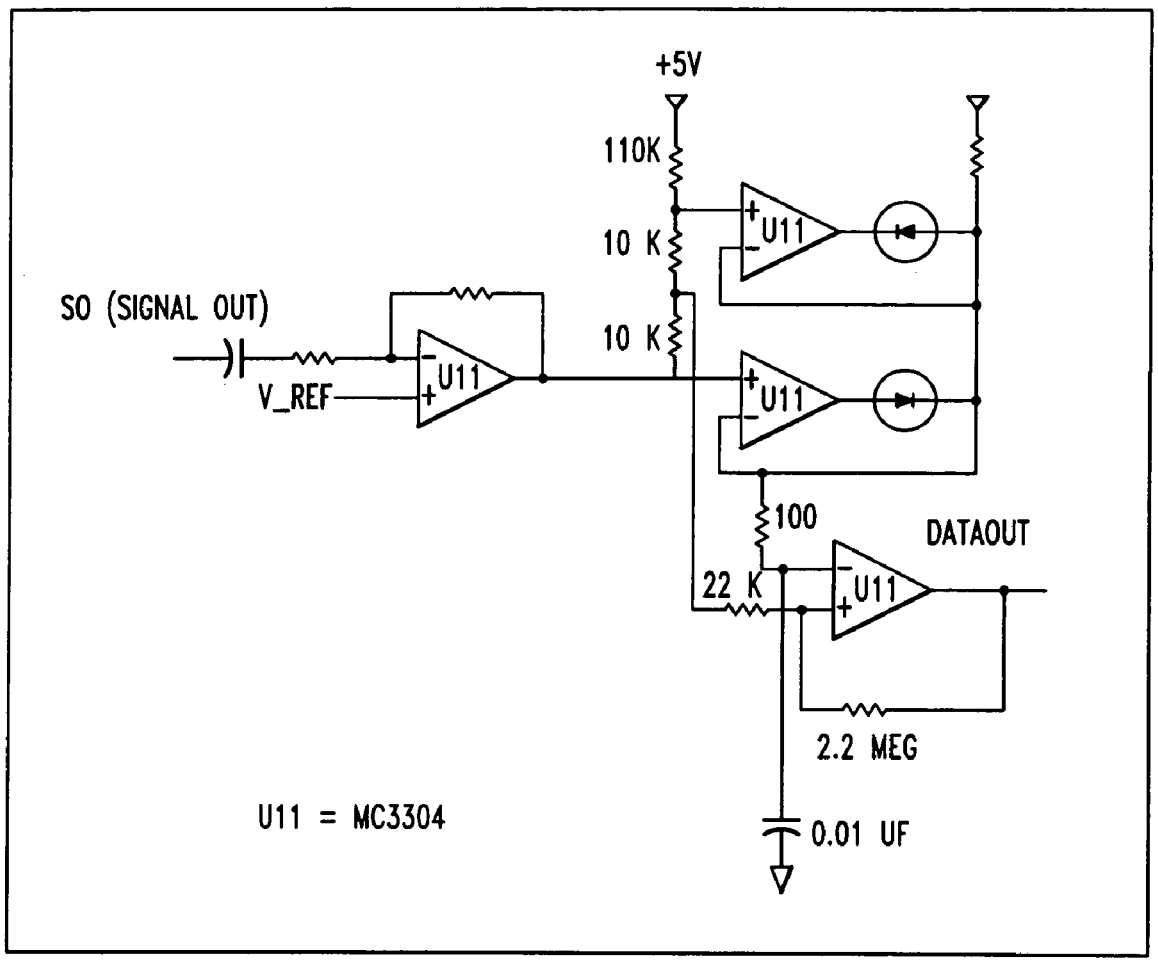
FIG. 24 is a circuit diagram for a signal conditioner included in a barcode reader.
Figure 25:
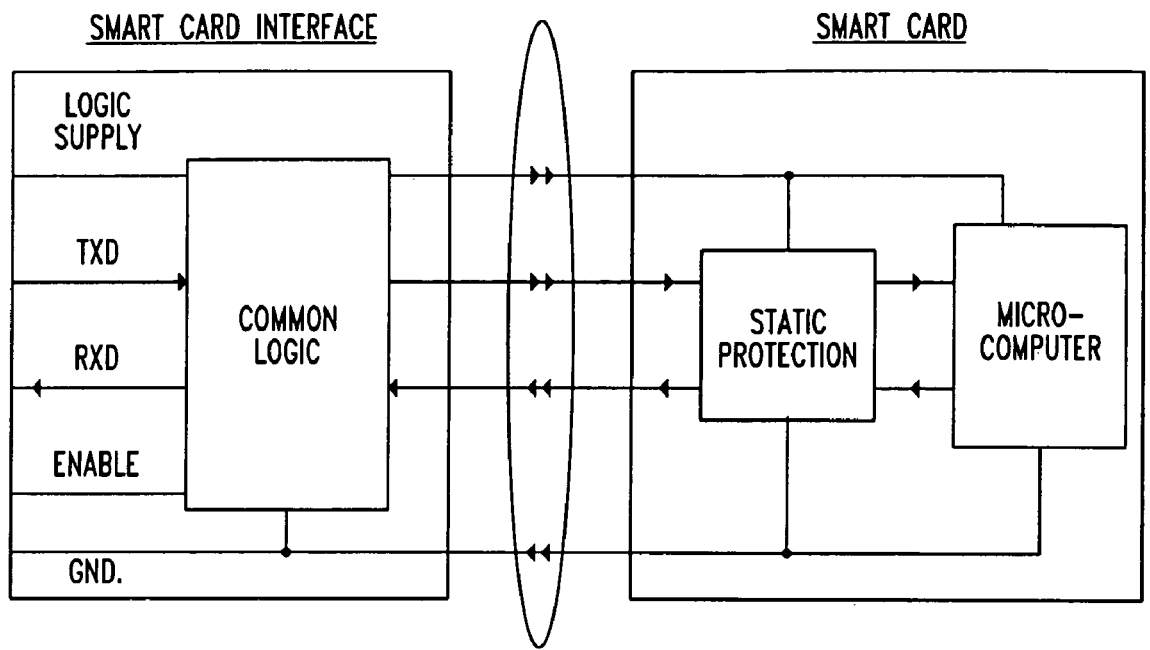
FIG. 25 is a block diagram for a smart card interface that may be included in a LHTD.
Figure 26:
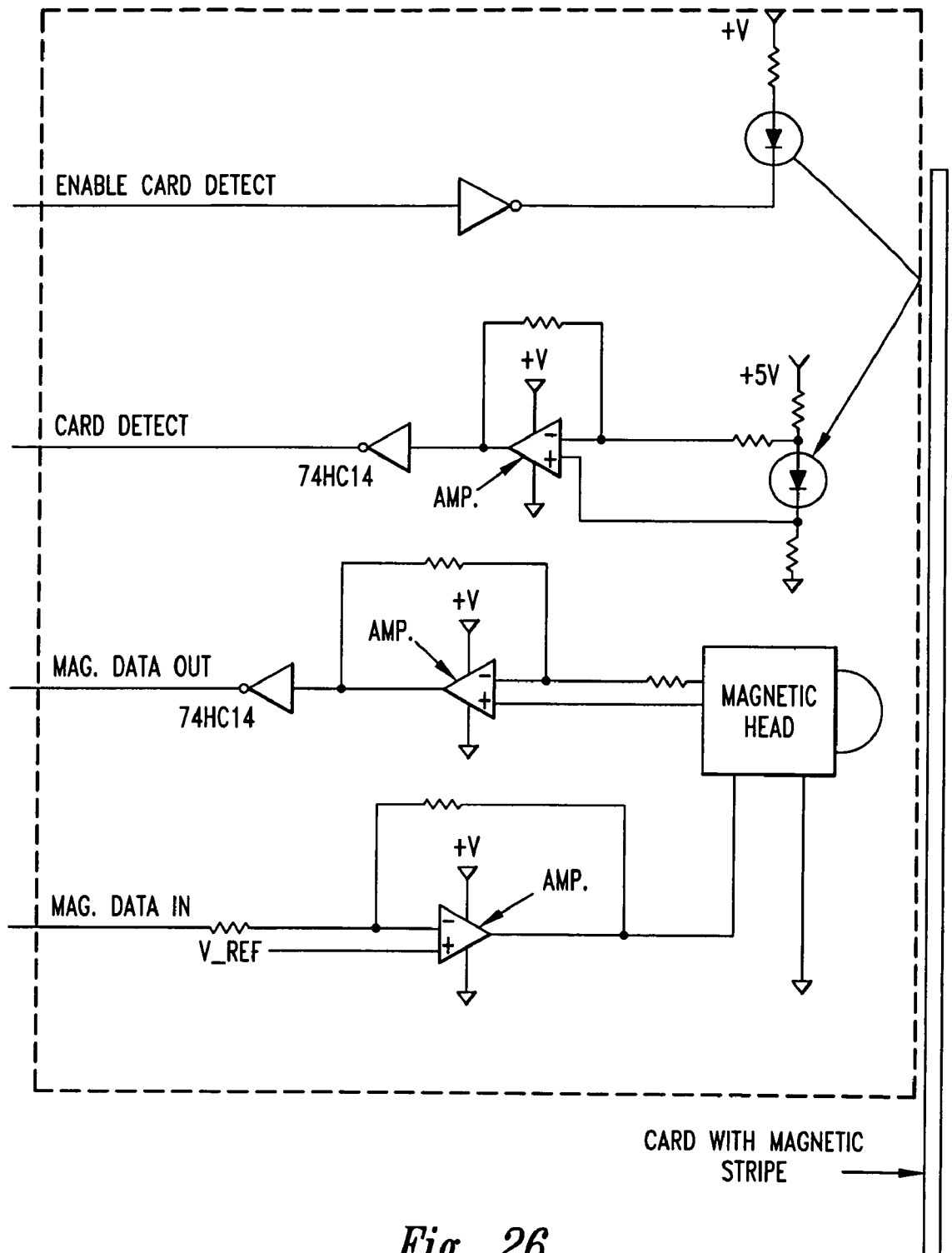
FIG. 26 is a circuit diagram for a magnetic card reader that may be included in a LHTD.
Figure 27:
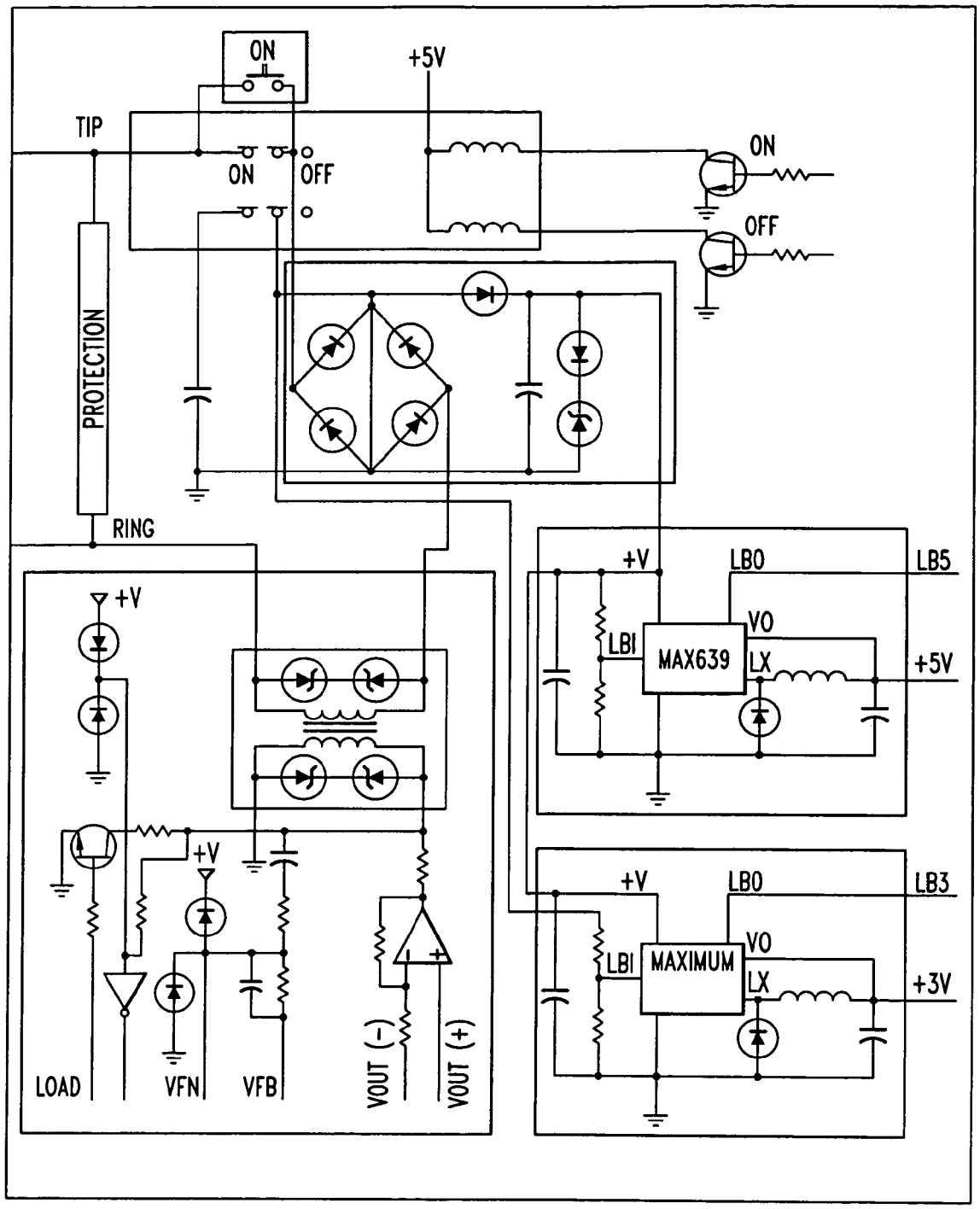
FIG. 27 is a circuit diagram for an alternate embodiment of a power supply for a LHTD designed for connection to a telephone line.
Figure 28:
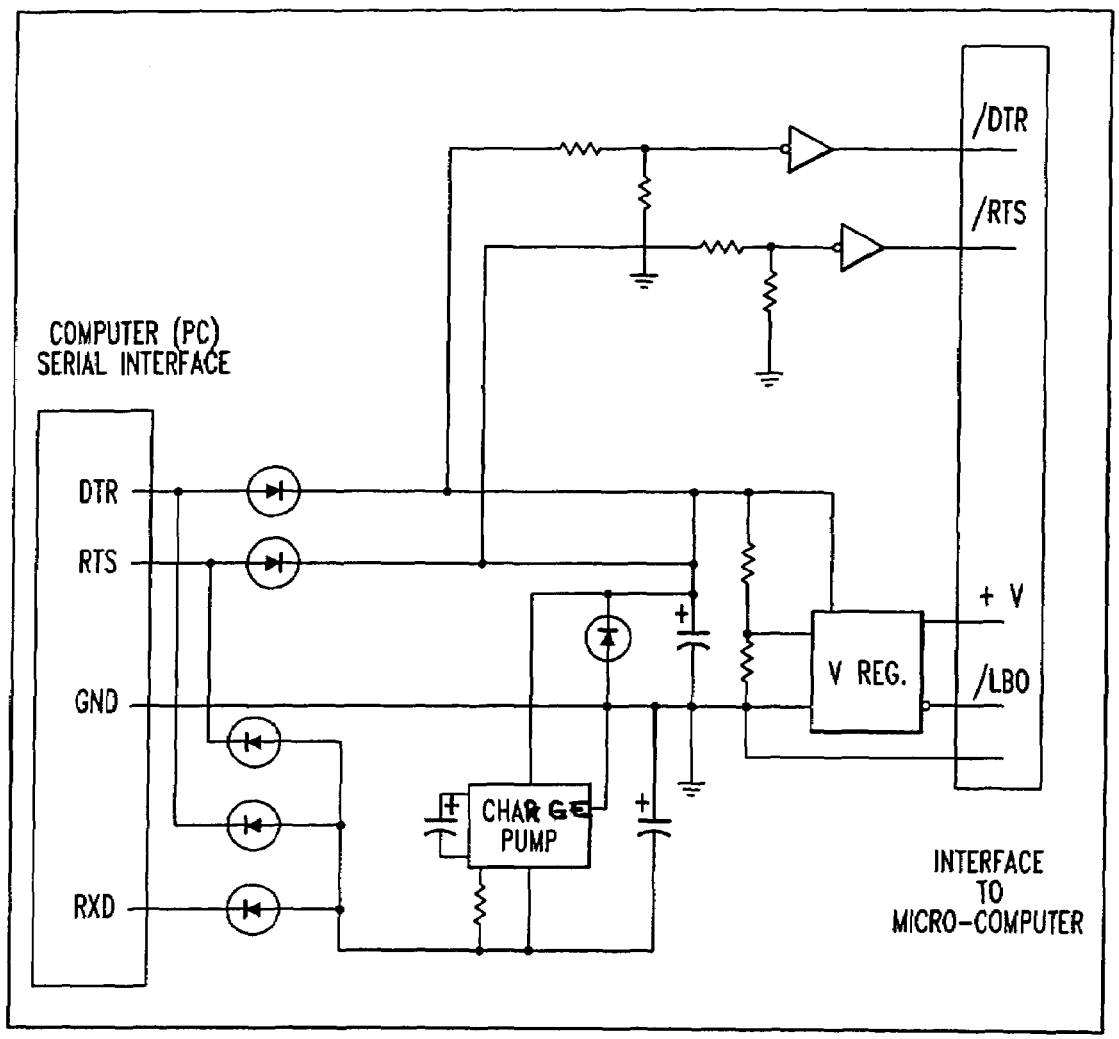
FIG. 28 is a circuit diagram for a serial port power supply.
Figure 29:
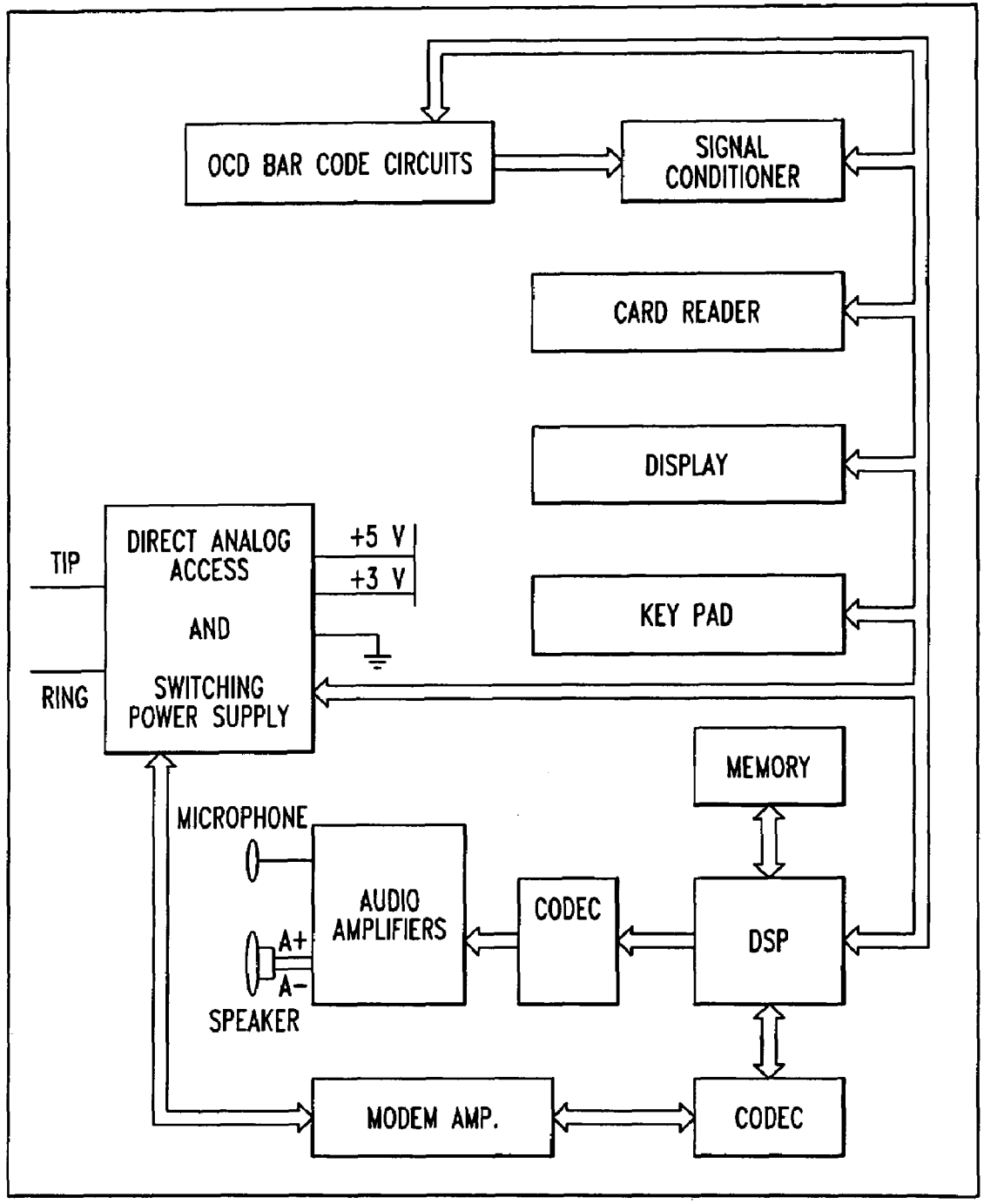
FIG. 29 is a block diagram for a LHTD specially designed for digital voice communications.
Figure 30:
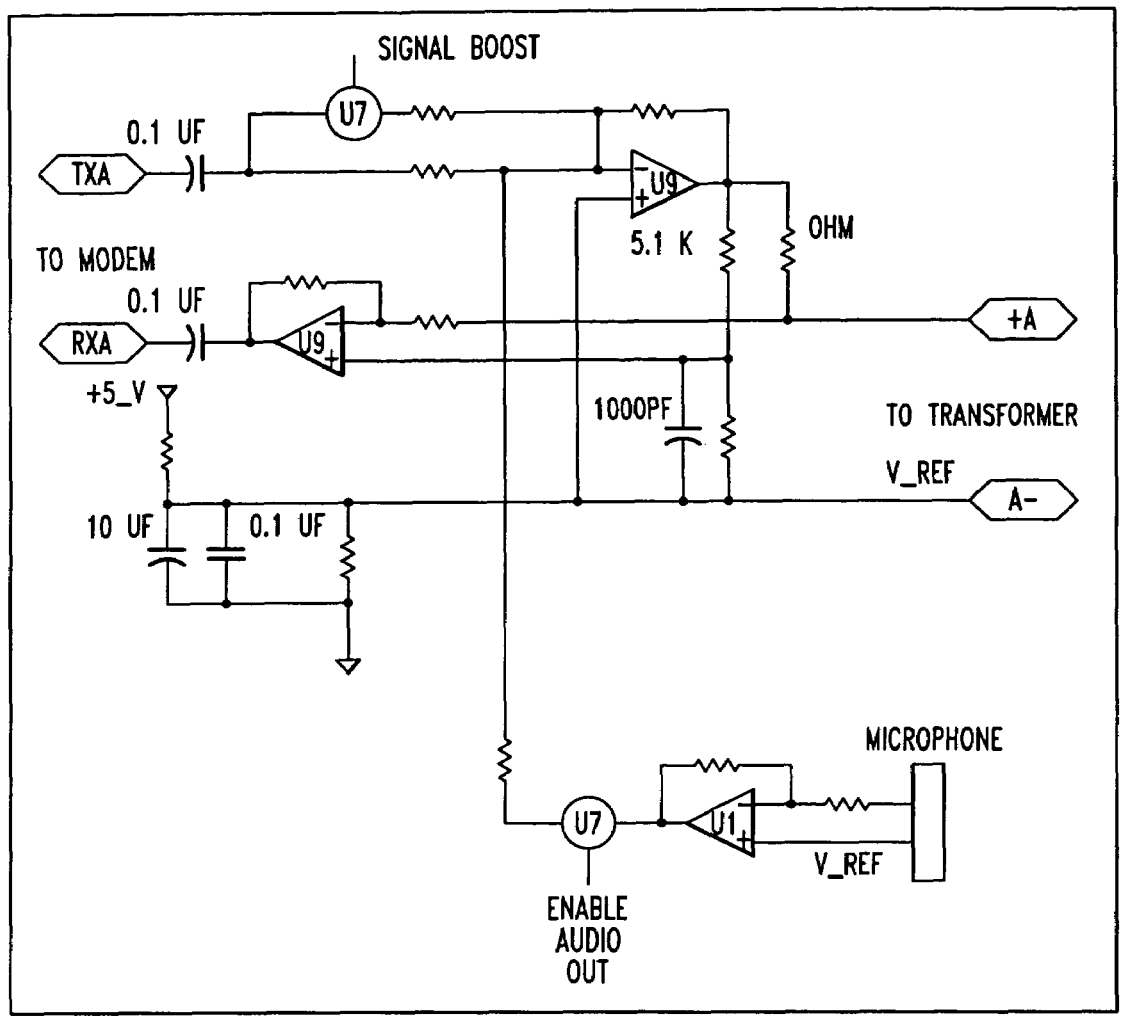
FIG. 30 is a circuit diagram for a modem interface to a voice and data mixer included in a LHTD designed for connection to a telephone line.

FIGS. 14-30 together display more detailed block and circuit diagrams of the internal components of various embodiments of the LHTD. FIG. 14 illustrates the external appearance of one embodiment of the LHTD. FIG. 15 is a detailed block diagram of an embodiment of a LHTD designed for connection to a telephone line. FIG. 16 is a circuit diagram for the telephone interface and power supply for the LHTD shown in FIG. 15. FIG. 17 is a circuit diagram for the LHTD described by the block diagram of FIG. 15. FIG. 18 is a circuit diagram for a LHTD designed to be connected to a cellular or PCS telephone. FIG. 19 is a circuit diagram for a LHTD designed to be connected to a wireless telephone. FIG. 20 is a block diagram for a two-unit LHTD designed for connection to a cordless telephone. FIG. 21 is a block diagram for a wireless two-unit LHTD designed for connection to a personal computer. FIG. 22 is a block diagram for a barcode reader with a separate proximity detector. FIG. 23 is a block diagram for a LHTD communicating with and powered by a serial port. FIG. 24 is a circuit diagram for a signal conditioner included in a barcode reader. FIG. 25 is a block diagram for a smart card interface that may be included in a LHTD. FIG. 26 is a circuit diagram for a magnetic card reader that may be included in a LHTD. FIG. 27 is a circuit diagram for an alternate embodiment of a power supply for a LHTD designed for connection to a telephone line. FIG. 28 is a circuit diagram for a serial port power supply. FIG. 29 is a block diagram for a LHTD specially designed for digital voice communications. FIG. 30 is a circuit diagram for a modem interface to a voice and data mixer included in a LHTD designed for connection to a telephone line.

Figure 31:
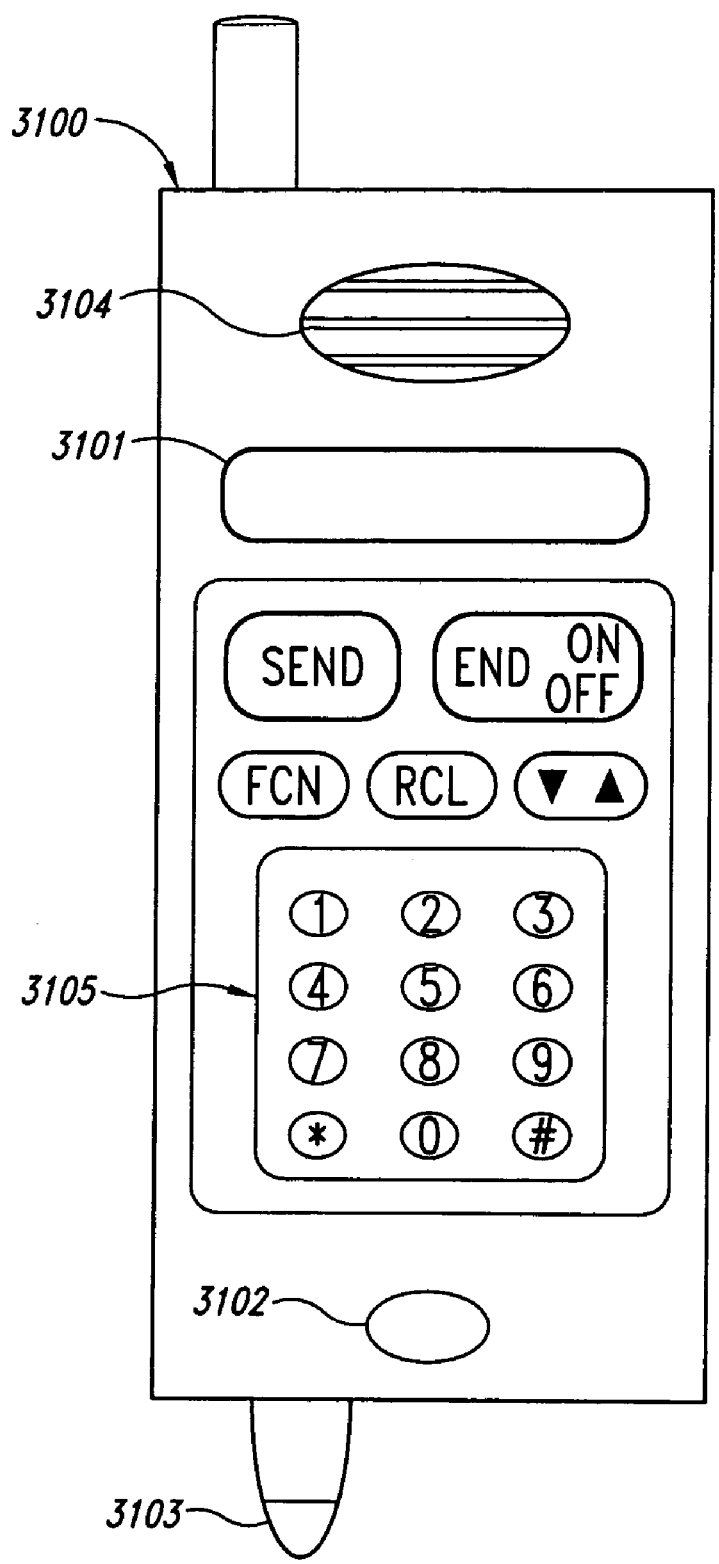
FIG. 31 is a block diagram of a lightweight, low power transaction device integrated with wireless telephone, such as a cellular or PCS telephone.

FIG. 31 is a block diagram of a lightweight, low power transaction device integrated with wireless telephone components to make a LHTD 3100 that is capable of online barcode order entry, providing bi-directional data-and-voice communications with an on-line server, and providing telephone communications between live people. The display 3101, microphone 3102, barcode reader 3103, speaker 3104, keypad 3105, and card reader 3106 are all capable of being active during order entry and telephone communications. The barcode reader 3103 and card reader 3106 may be used off-line to store bar codes into non-volatile memory for later use, such as storing UPC product codes for later on-line order entry.

Figure 32:
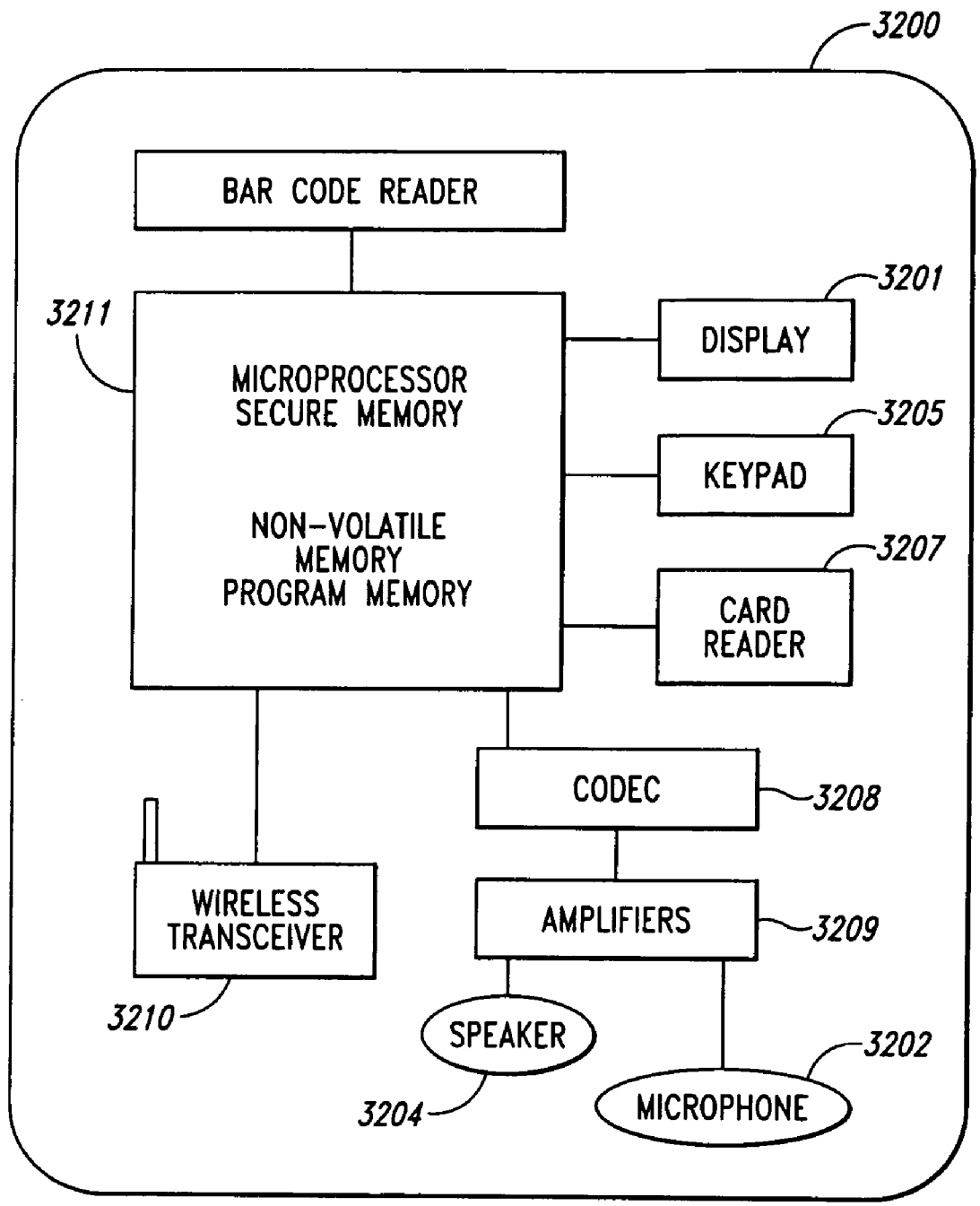
FIG. 32 is a schematic diagram of the hand-held transaction device integrated with a wireless telephone, such as a cellular or PCS telephone.

FIG. 32 is a block diagram of LHTD circuits. The bar code reader 3203 is an optical reader such as LED, CCD, or laser barcode reader. The card reader 3207 may be a "smart card" or magnetic card reader. Smart card functionality may also be preformed by the microprocessor 3211. The codec 3208 takes analog signals from an amplifier 3209 and a microphone 3202 and encodes the analog signals into digital signals to be processed by microprocessor 3211. The wireless ("RF") transceiver 3210 receives digital voice-and-data packets from the on-line server. Programs in microprocessor 3211 convert voice packets into a digital format compatible with codec 3208. The codec 3208 converts the digital voice signals to analog voice signals. The analog voice signals are then processed by amplifier 3209, which, in turn, drives speaker 3204 for audio presentation to user. The microprocessor 3211 also directs some of the data packets received form transceiver 3210 to the display 3201 for visual presentation to user.

The various embodiments of the LHTD, discussed above, find broad application in a large number of different fields. As discussed above, the LHTD provides a convenient, mobile and accessible order entry device for inputting product information, constructing requests based on that product information, sending the requests to a server computer, and receiving responses to the requests which the LHTD may display in a variety of different display media, including a visual text and graphic displays, pictures, video, audio tones, or printed symbols. The requests may be for ordering one or more of the products specified by the input information, including, for example, products specified by barcodes. Additional keypad input may specify the number of products to be ordered and perhaps additional information concerning the order, including destination for receiving the products, the account to bill, and other such information, etc. These various aspects of the order may be included in a single request or may be included in a number of successive requests sent to the computer server.

An especially convenient feature of the LHTD is that a user may indicate, through keypad input, a desire to speak directly with a human operator rather than exchanging requests with a computer server. Because the LHTD supports normal voice communications, just as a standard telephone, the transition from digital requests targeted for a server computer to analog or digitized voice communications with a human operator is straightforward. Moreover, because in certain embodiments the LHTD can be operated while uncoupled from the telecommunications link using stored electrical energy, as described above, the LHTD can be used to input request data and store that input request data for transmission to a server computer at a later time.

The LHTD may be used to solicit additional information about a product indicated by a barcode or keypad input. Thus, a printed advertisement that included barcode indicators can easily be turned into a talking advertisement by use of the LHTD, providing additional information in the form of spoken dialog or even music. The LHTD can be employed to provide updated information on arrival and departure times and seat assignments for a flight corresponding to a printed airline ticket. The spoken dialog can, in addition, be presented in any number of different foreign languages, with the keypad of the LHTD used to select the desired spoken language. A children's book that included barcodes or other LHTD-readable indications along with the text and pictures can become, with the use of the LHTD, a talking or multimedia children's book including spoken dialog, music, and perhaps additional information displayed through the visual display of the LHTD. The LHTD can be used for all manners of inventory operations, including monitoring supplies, ordering supplies, and inquiring about alternative providers for supplies. The LHTD can provide the power of a server computer, including complex database applications and multimedia presentations via a telecommunications link to the small, hand-held, inexpensive LHTD. The LHTD is thus essentially a multimedia terminal that can be remotely connected to a server computer. A LHTD might be used in a household kitchen for purchasing groceries, storing and displaying recipes, for diagnosing problems and failures in kitchen appliances, and for quickly obtaining poison control information for household products in kitchen cabinets.

Because the LHTD contains a microprocessor, the LHTD can communicate with a server computer in a variety of different, relatively high-level communication protocols, including TCP/IP. Thus, the LHTD is an Internet compatible device. Alternatively, the LHTD can be directly connected via a modem bank to a computer, without necessarily employing TCP/IP, and without using the Internet. In yet additional embodiments of the LHTD, the input/output, and microprocessor components of the LHTD may be located in a different physical unit from the transceiver component of the LHTD, with the two components coupled by radio frequency or optical communications. In this embodiment, the input/output components of the LHTD are even more mobile and easy to use. Two LHTDs may communicate with each other via a shared telecommunications link.

Although the present invention has been described in terms of one embodiment, it is not intended to be limited to this embodiment. Modifications within the sphere of the invention would be apparent to those skilled in the art. For example, a large number of different power-management strategies can be employed to insure that the hand-held device can operate efficiently and for relatively long periods of time using the electrical power available from the telecommunications link. As discussed above, capacitors and batteries can be used to store electrical power obtained from the telecommunications link for later use. As another example, many different types of input and output devices may be employed. The LHTD may include various types of barcode readers, including single point band readers, CMOS image sensor readers, CCD readers, and low-power laser readers, and may also include various types of magnetic credit card readers, various types of electronic smart card readers, any number of different types of visual displays, keypads, sound generators, and sound input devices. The LHTD may include any number of different combinations of these input and output devices. A wide variety of different types and models of processors, voltage regulators, transceivers, amplifiers, microprocessors, and input and output devices can be used to build the LHTD. For example, the transceiver component may be implemented using any number of different modem chips, including V22, V29, V31, V32, and V34 chips. The V34 and V32 chips are Internet compatible, while the V29 and V31 chips are not Internet compatible, but provide very fast connect times. A wireless LHTD device may use both an RF transceiver to establish connection to the PSTN and a modem to communicate with a dial-up modem service or Internet Access Provider. Alternatively, the RF transceiver may be used in a wireless LHTD to communicate data-and-voice packets with the cellular network and have the cellular network provide the necessary data conversions and connections for Internet access. The LHTD may be used in literally thousands of different applications, having a breath of applicability larger, in many respects, than personal computers or laptop computers. For example, the LHTD contains hardware support for secure transactions using credit card numbers whereas personal computers generally do not support fully secure transactions because they lack fully protected memory. In fact, the LHTD may be employed as an add on to a personal computer for acquiring magnetic credit card numbers and electronic smart card numbers in encrypted forms for use in commercial transactions, avoiding input of this type of sensitive information in unencrypted form into the memory of the personal computer.

The LHTD may be built into a wireless phone and may share resources such as micro-processors, keypads, and displays with the wireless phone. Telecommunication manufacturers may use those same resources to add computer features and other features not related LHTD.

The LHTD has a display, such as an LCD display, for showing alpha-numeric and graphics from a remote site. LCD display technology is rapidly improving in picture quality. The graphics shown on the display may be images, such as pictures of products, people, and places. As LCD displays improve, and the bandwidth of wireless telecommunication networks also improve, those images may become moving images. These improved images and moving images fall within the spirit and the scope of the present invention.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for inputting a request to a hand-held device, securely transmitting a server request corresponding to the input request from the hand-held device to a server computer through a wireless communications link, receiving a server response to the server request by the hand-held device from the server computer, and outputting a response corresponding to the server response by the hand-held device, the hand-held device having:
    one or more input components for inputting request data from one or more different input media, including mechanical manipulation of an input component and at least one of additional input media including data displayed by a display component of the hand-held device, audio tones, and electronic, magnetic, and printed request data,
    a processing component that constructs a server request from request data received from one or more of the input components,
    a transceiver component that sends the server request to the server computer and receives the server response from the server computer, and
    two or more output components,
    the method comprising:
        coupling the hand-held device to the communications link;
        inputting the request from one or more input media to one or more input components of the hand-held device;
        processing the input request to produce the corresponding server request;
        transmitting the server request to the server computer;
        receiving the server response from the server computer through the communications link; and
        outputting the response corresponding to the server response, via one or more of the two or more output components.

2. The method of claim 1 wherein the input media is one of: audio tones, keypad input, and extracting data encoded in one of a mechanical medium, a magnetic medium, an electronic medium, and a printed medium.

3. The method of claim 1 wherein the input media is a combination of two or more of input media selected from: audio tones, keypad input, and extracting data encoded in one of a mechanical medium, a magnetic medium, an electronic medium, and a printed medium.

4. The method of claim 1 wherein the telecommunications link is one of: a standard telephone line; a cellular telephone; a PBX telephone line; a wireless telephone; a personal communication system telephone; a radio frequency connection; a cordless telephone; and an RS232 or universal serial bus to a computer that is, in turn, coupled to a remote server computer via a telecommunications link.

5. The method of claim 1 wherein the input request includes an access code.

6. The method of claim 5 wherein the access code is one of: an IP address; a URL; a web site address; a product/service ID code; and a phone number.

7. The method of claim 1 further including storing the input request in non-volatile memory for communication via telecommunication link at a later time or date.

8. The method of claim 7 further including: transmitting a request, previously stored in non-volatile memory, via a telecommunication link to a server.

9. The method of claim 1 wherein the hand-held device includes a smart card reader input component for inputting information encoded electronically in a smart card.

10. The method of claim 1 wherein the hand-held device includes a magnetic card reader input component for inputting information encoded magnetically on a magnetic card.

11. The method of claim 1 wherein the hand-held device includes a bar code reader input component for inputting information stored in a printed bar code.

12. The method of claim 11 wherein the bar code reader comprises a bank of illumination elements for illuminating a printed bar code, an optical element for gathering light reflected from the printed bar code, a charge coupled device for sensing bar codes from the gathered light, and a low-power proximity detector; and wherein, when activated, the bar code reader activates the low-power proximity detector to first detect a reflective surface within a threshold distance from the optical element prior to activating the illumination elements to read a bar code.

13. The method of claim 11 wherein the bar code reader comprises a laser bar code reader.

14. The method of claim 11 wherein the bar code reader comprises a LED bar code reader.

15. The method of claim 11 wherein the bar code reader comprises a CCD bar code reader.

16. The method of claim 1 wherein the hand-held device includes a telephone for person-to-person communication or person-to-computer computer server communication.

17. The method of claim 1 wherein the hand-held device includes a speaker output component for outputting audio information.

18. The method of claim 1 wherein the hand-held device includes a microphone input component for inputting an input request represented by audio tones.

19. The method of claim 1 wherein the hand-held device includes a keypad input component for inputting an input request represented by mechanical manipulation of the keypad.

20. The method of claim 1 wherein the hand-held device includes a visual display output component capable of displaying alphanumeric symbols.

21. The method of claim 1 wherein the hand-held device includes a visual display output component capable of displaying both alphanumeric symbols and graphical images.

22. The method of claim 1 wherein the hand-held device includes a printer output component.

23. The method of claim 1 wherein the hand-held device includes an input or output component comprising a serial interface element such as RS232.

* * * * *